United States Patent
Yang et al.

(10) Patent No.: US 12,200,695 B2
(45) Date of Patent: *Jan. 14, 2025

(54) METHOD FOR TRANSMITTING OR RECEIVING SIGNAL IN WIRELESS COMMUNICATION SYSTEM SUPPORTING UNLICENSED BAND AND APPARATUS FOR SUPPORTING SAME METHOD

(71) Applicant: LG Electronics Inc., Seoul (KR)

(72) Inventors: Suckchel Yang, Seoul (KR); Hanjun Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,196

(22) Filed: Dec. 23, 2022

(65) Prior Publication Data
US 2023/0131373 A1 Apr. 27, 2023

Related U.S. Application Data

(63) Continuation of application No. 17/267,445, filed as application No. PCT/KR2019/010056 on Aug. 9, 2019, now Pat. No. 11,570,802.

(Continued)

(51) Int. Cl.
*H04W 72/1268* (2023.01)
(52) U.S. Cl.
CPC .............................. *H04W 72/1268* (2013.01)
(58) Field of Classification Search
None
See application file for complete search history.

(56) References Cited

U.S. PATENT DOCUMENTS 10,873,936 B2 * 12/2020 Huang ................. H04L 5/0098
11,375,527 B1 6/2022 Eyuboglu et al.
(Continued)

FOREIGN PATENT DOCUMENTS

KR 20150121205 10/2015
WO WO2017105135 6/2017
(Continued)

OTHER PUBLICATIONS

PCT International Search Report and Written Opinion in International Appln. No. PCT/KR2019/010056, dated Nov. 18, 2019, 18 pages (with English translation).

*Primary Examiner* — Phirin Sam
(74) *Attorney, Agent, or Firm* — Fish & Richardson P.C.

(57) ABSTRACT

The present invention relates to a wireless communication system and, specifically, to a method and an apparatus therefor, the method comprising the steps of: receiving scheduling information for a plurality of consecutive transmission time intervals (TTIs) and transmitting data on the basis of the scheduling information, wherein the scheduling information includes a combination of a first symbol index and the number of consecutive symbols, the data is transmitted from a starting symbol of a first TTI (starting TTI) among the plurality of consecutive TTIs to an ending symbol of the last TTI on the basis of the scheduling information, and the index of the starting symbol and the index of the ending symbol are determined on the basis of the combination of the first symbol index and the number of the consecutive symbols.

16 Claims, 20 Drawing Sheets

Receiving Scheduling Information — S1510

Receiving data from a start symbol of a first TTI to a last symbol of a last TTI — S1520

Related U.S. Application Data

(60) Provisional application No. 62/716,919, filed on Aug. 9, 2018.

(56) References Cited

U.S. PATENT DOCUMENTS

| | | | |
|---|---|---|---|
| 11,570,802 B2* | 1/2023 | Yang | H04L 5/0082 |
| 2015/0009953 A1 | 1/2015 | Park et al. | |
| 2016/0234830 A1 | 8/2016 | Kim et al. | |
| 2019/0149365 A1* | 5/2019 | Chatterjee | H04L 25/0226 |
| | | | 370/329 |
| 2019/0150123 A1 | 5/2019 | Nogami et al. | |
| 2019/0158205 A1 | 5/2019 | Sheng et al. | |
| 2019/0306856 A1* | 10/2019 | Ji | H04W 72/0446 |
| 2019/0306875 A1 | 10/2019 | Zhou et al. | |
| 2019/0306909 A1 | 10/2019 | Zhou et al. | |
| 2019/0313434 A1 | 10/2019 | Zhou et al. | |
| 2019/0349061 A1 | 11/2019 | Cirik et al. | |
| 2019/0394759 A1* | 12/2019 | Ying | H04L 1/0061 |
| 2020/0037348 A1 | 1/2020 | Nam et al. | |
| 2020/0053724 A1* | 2/2020 | MolavianJazi | H04W 72/044 |
| 2020/0374967 A1 | 11/2020 | Nogami et al. | |
| 2020/0404656 A1* | 12/2020 | Ji | H04W 76/10 |
| 2021/0235481 A1* | 7/2021 | Takeda | H04L 5/0053 |

FOREIGN PATENT DOCUMENTS

| | | |
|---|---|---|
| WO | WO2017135880 | 8/2017 |
| WO | WO2018027540 | 2/2018 |

\* cited by examiner

Carrier aggregation between L-band and U-band

Standalone U-band(s)

METHOD FOR TRANSMITTING OR RECEIVING SIGNAL IN WIRELESS COMMUNICATION SYSTEM SUPPORTING UNLICENSED BAND AND APPARATUS FOR SUPPORTING SAME METHOD

CROSS-REFERENCE TO RELATED APPLICATIONS

This application is a continuation of U.S. application Ser. No. 17/267,445, filed on Feb. 9, 2021, which is a National Stage application under 35 U.S.C. § 371 of International Application No. PCT/KR2019/010056, filed on Aug. 9, 2019, which claims the benefit of U.S. Provisional Application No. 62/716,919, filed on Aug. 9, 2018. The disclosures of the prior applications are incorporated by reference in their entirety.

TECHNICAL FIELD

The present disclosure relates to a method and apparatus used in a wireless communication system, and more particularly, to a method and apparatus for transmitting and receiving a signal in a wireless communication system supporting an unlicensed band.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

The necessity for mobile broadband communication more improved than the conventional radio access technology (RAT) has increased as a number of communication devices have required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

SUMMARY

Provided are a method and apparatus for transmitting and receiving a signal in a wireless communication system supporting an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system supporting an unlicensed band.

In an aspect of the present disclosure, a communication method of an apparatus in a wireless communication system includes receiving scheduling information for a plurality of consecutive transmission time intervals (TTIs), and transmitting or receiving data based on the scheduling information. The scheduling information includes information about a combination of a first symbol index and the number of consecutive symbols, the data is transmitted or received in a starting symbol in the first of the plurality of consecutive TTIs to an ending symbol in the last of the plurality of consecutive TTIs, based on the scheduling information, and the index of the starting symbol and the index of the ending symbol are determined based on the first symbol index and the number of consecutive symbols.

In another aspect of the present disclosure, an apparatus used in a wireless communication system includes a memory and a processor. The processor is configured to receive scheduling information for a plurality of consecutive transmission time intervals (TTIs), and transmit or receive data based on the scheduling information. The scheduling information includes information about a combination of a first symbol index and the number of consecutive symbols, the data is transmitted or received in a starting symbol in the first of the plurality of consecutive TTIs to an ending symbol in the last of the plurality of consecutive TTIs, based on the scheduling information, and the index of the starting symbol and the index of the ending symbol are determined based on the first symbol index and the number of consecutive symbols.

For example, the scheduling information may further include information about the number of the plurality of consecutive TTIs.

For example, the index of the starting symbol may be the first symbol index, and the index of the ending symbol may be determined by (the first symbol index+the number of consecutive symbols) mod (a maximum number of symbols in a single TTI) where mod may represent a modulo operation.

For example, the downlink scheduling information may further include a side information bit. When the side information bit has a first value, the index of the starting symbol may be the first symbol index, and the index of the ending symbol may be determined based on the first symbol index and the number of consecutive symbols.

For example, when the side information bit has a second value, the index of the starting symbol may be determined based on the first symbol index and the number of consecutive symbols, and the index of the ending symbol may be determined as the first symbol index.

For example, the information about the combination of the first symbol index and the number of consecutive symbols may be received in downlink control information, and correspond to one of a plurality of combination candidates configured by a higher-layer signal.

The apparatus applied to the embodiments of the present disclosure may include an autonomous driving vehicle.

The above-described aspects of the present disclosure are only some of the preferred embodiments of the present disclosure, and various embodiments reflecting the technical features of the present disclosure will be described in detail below may be derived and understood by those skilled in the art.

According to the embodiments of the present disclosure, a plurality of consecutive transmission time intervals (TTIs) may be efficiently scheduled in an unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
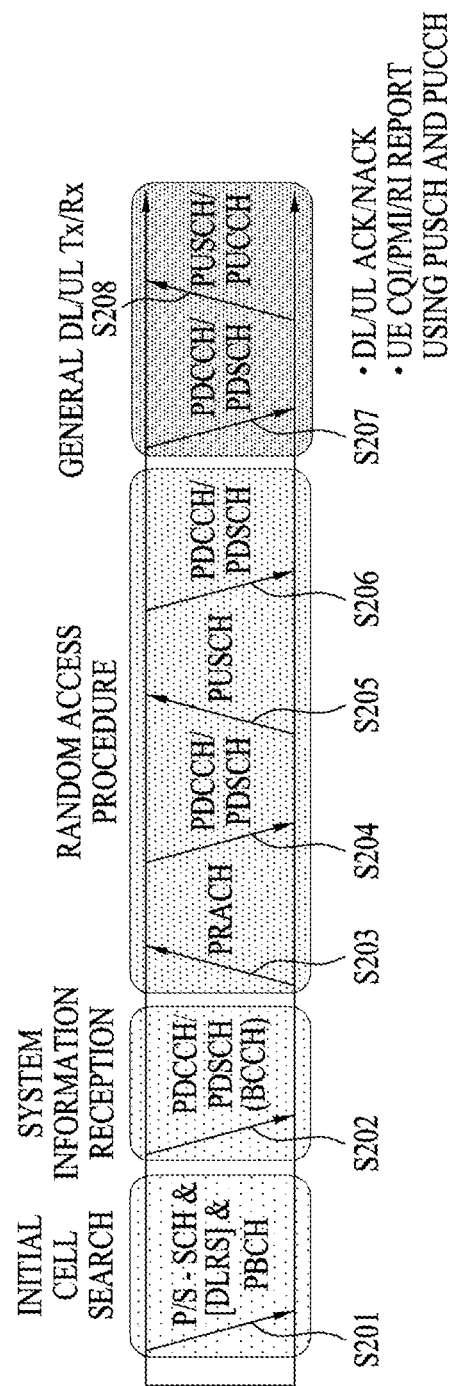
FIG. 1 is a diagram illustrating physical channels and a signal transmission method using the physical channels.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

Through the specification, when it is said that a part "comprises or includes" a component, this means that the part may further include other components, not excluding them, unless otherwise specified. The term used herein "unit", "-or (er)", or "module" signifies a unit of executing at least one function or operation, which may be implemented in hardware, software, or a combination of both. Further, "a or an", "one", "the", and other similar terms may cover both singular and plural referents, unless otherwise indicated in the context of describing the present disclosure (particularly in the context of the appended claims) or unless contextually contradicted.

In the embodiments of the present disclosure, a description is made, centering on a data transmission and reception relationship between a base station (BS) and a mobile station (MS). The BS is a terminal node of a network, which communicates directly with an MS. In some cases, a specific operation described as performed by the BS may be performed by an upper node of the BS.

That is, in the network including a plurality of network nodes including the BS, various operations performed for communication with the MS may be performed by the BS or network nodes other than the BS. In the present disclosure, the term BS may be replaced with the term fixed station, Node B, evolved Node B (eNode B or eNB), gNode B (gNB), advanced base station (ABS), or access point. Further, the term BS may cover remote radio head (RRH), eNB, transmission point (TP), reception point (RP), and relay in its broad sense.

In the embodiments of the present disclosure, the term terminal may be replaced with the term user equipment (UE), MS, subscriber station (SS), mobile subscriber station (MSS), mobile terminal, or advanced mobile station (AMS).

Techniques described herein may be used in various wireless access systems such as code division multiple access (CDMA), frequency division multiple access (FDMA), time division multiple access (TDMA), orthogonal frequency division multiple access (OFDMA), and single carrier-frequency division multiple access (SC-FDMA).

CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, and evolved-UTRA (E-UTRA).

UTRA is a part of universal mobile telecommunications system (UMTS). 3rd generation partnership project (3GPP) LTE is a part of Evolved UMTS (E-UMTS) using E-UTRA. 3GPP LTE employs OFDMA for DL and SC-FDMA for UL. LTE-A/LTE-A pro is an evolution of 3GPP LTE. 3GPP new radio or new radio access technology (NR) is an evolution of 3GPP LTE/LTE-A/LTE-A pro.

While the embodiments of the present disclosures are described in the context of a 3GPP NR system, for clarity, they are also applicable to an IEEE 802/16e/m system as well as a 3GPP LTE/LTE-A system.

FIG. 1 illustrates physical channels and a general signal transmission method using the physical channels in a 3GPP system.

In a wireless access system, a UE receives information from a BS on downlink (DL) and transmits information to the BS on uplink (UL). The information transmitted and received between the UE and the BS includes general data and various types of control information. There are many physical channels according to the types/usages of information transmitted and received between the BS and the UE.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

In an unlicensed band of the NR system, the random access procedure may be performed in two steps. For example, the UE may transmit a first message (Msg1) to the BS and receive a second message (Msg2) in response to Msg1 from the BS. Msg1 is a combination of the preamble (S13) and the PUSCH transmission (S15), and Msg2 is a combination of the RAR (S14) and the contention resolution message (S16).

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
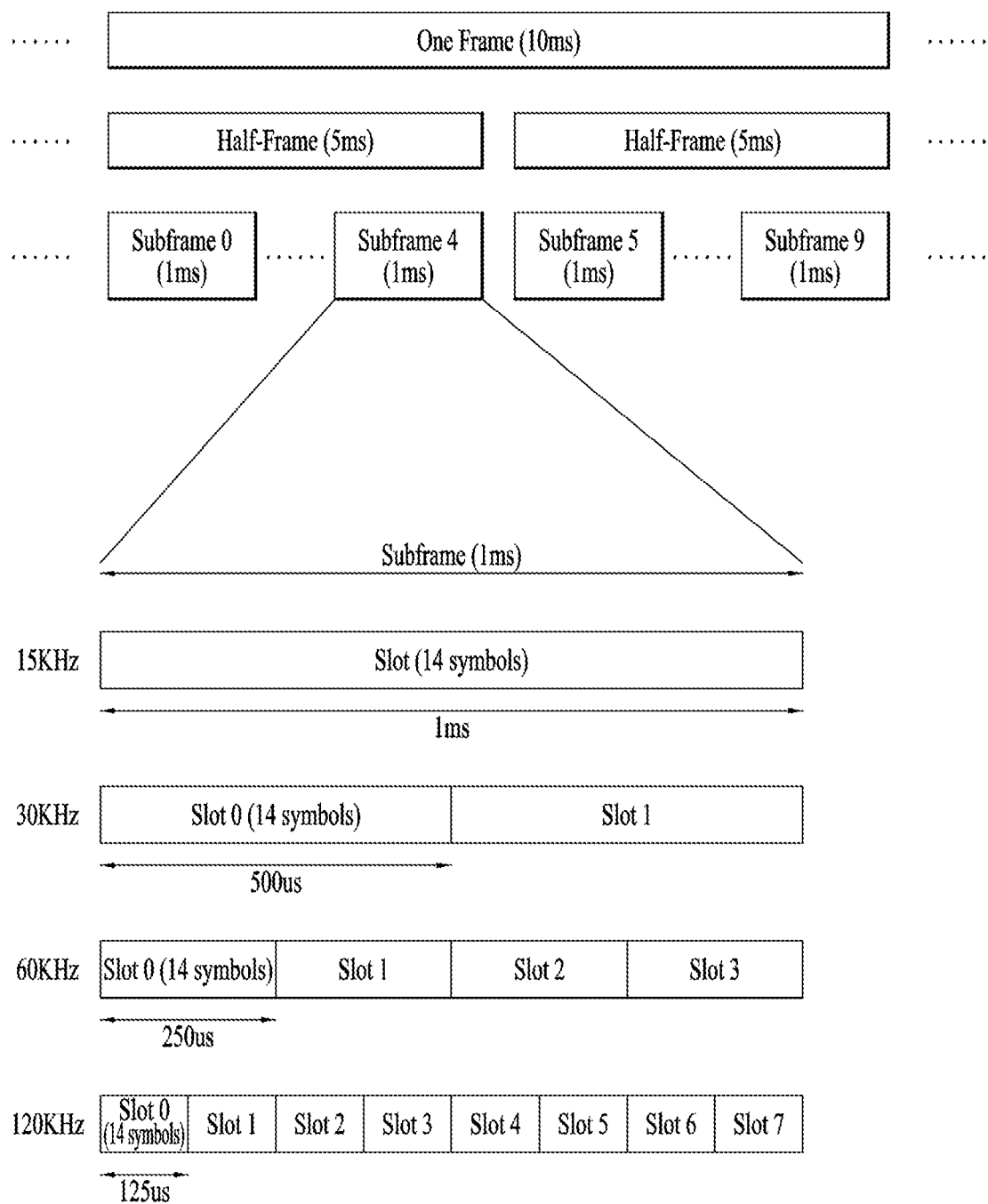
FIG. 2 is a diagram illustrating a radio frame structure.

FIG. 2 is a diagram illustrating radio frame structures to which embodiments of the present disclosure are applicable.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

In the NR system, different OFDM(A) numerologies (e.g., SCSs, CP lengths, and so on) may be configured for a plurality of cells aggregated for one UE. Accordingly, different (absolute time) durations of time resources including the same number of symbols may be configured for the aggregated cells.

Figure 3:
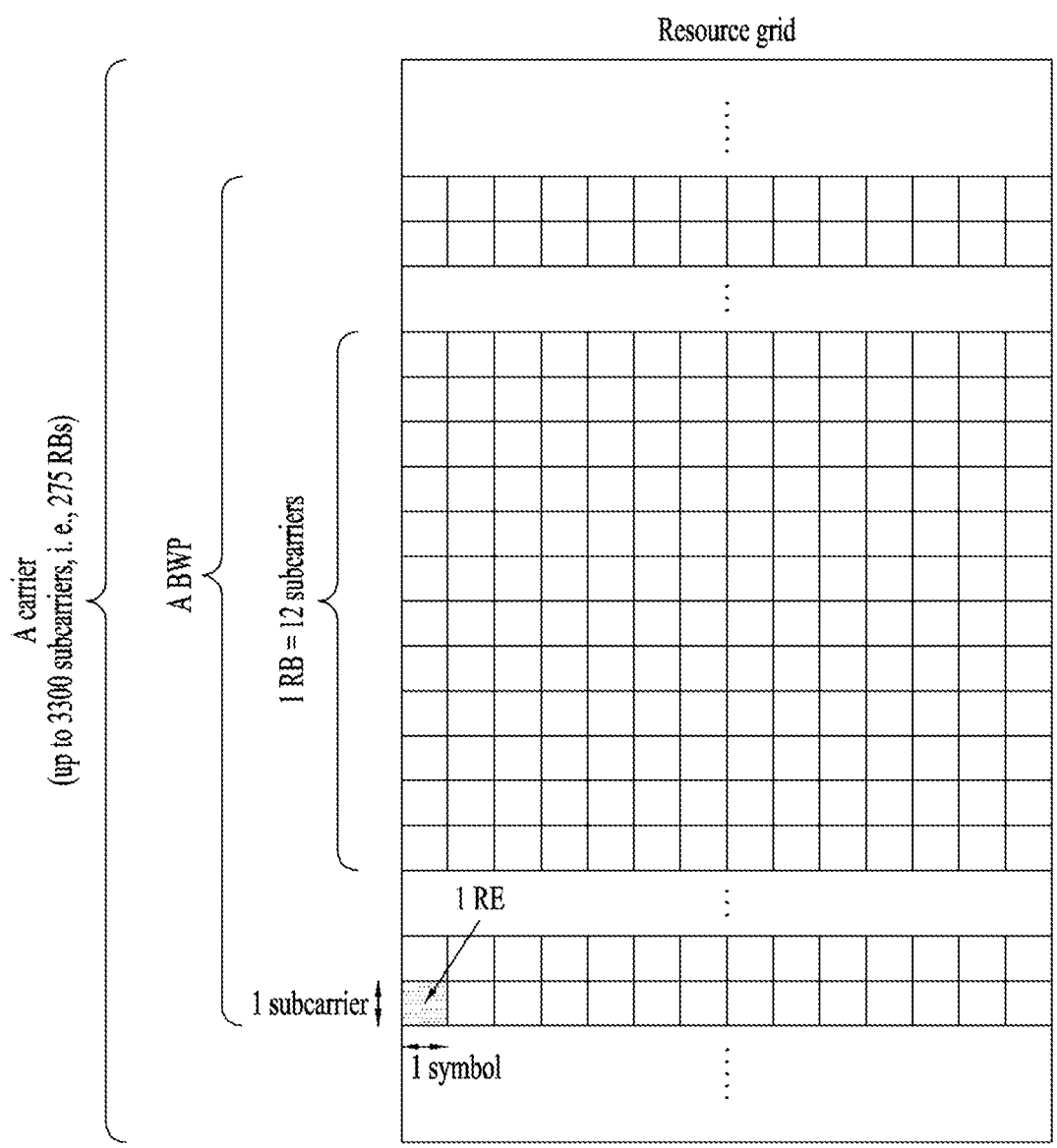
FIG. 3 is a diagram illustrating a slot structure in a frame.

FIG. 3 is a diagram illustrating exemplary slot structures to which embodiments of the present disclosure are applicable.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
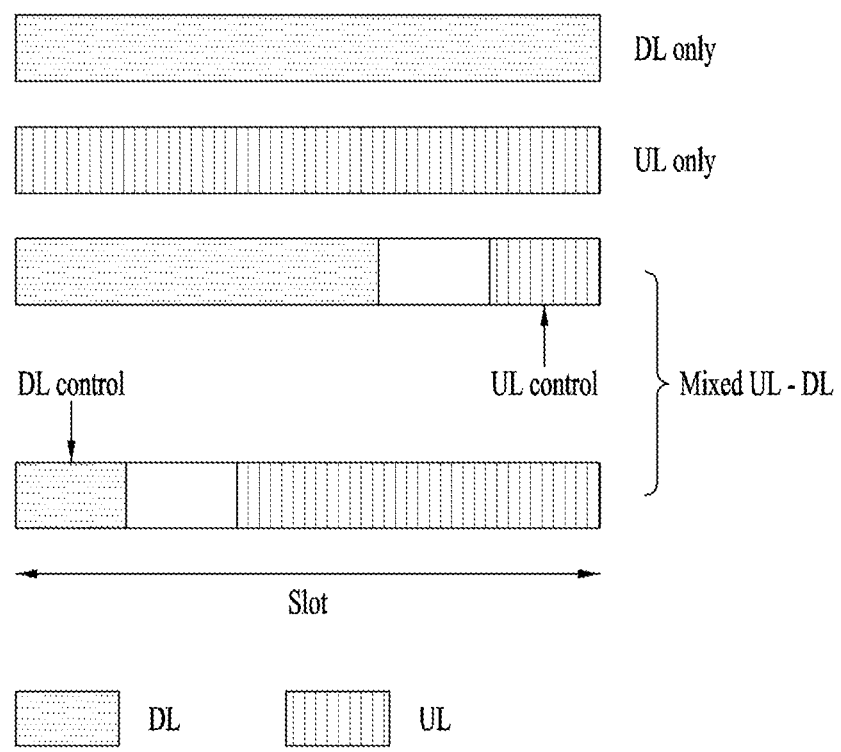
FIG. 4 is a diagram illustrating a self-contained slot structure.

FIG. 4 is a diagram illustrating the structure of a self-contained slot in the NR system to which embodiments of the present disclosure are applicable.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+ DL data region
    UL region: (i) UL data region, (ii) UL data region+UL control region.

Figure 5:
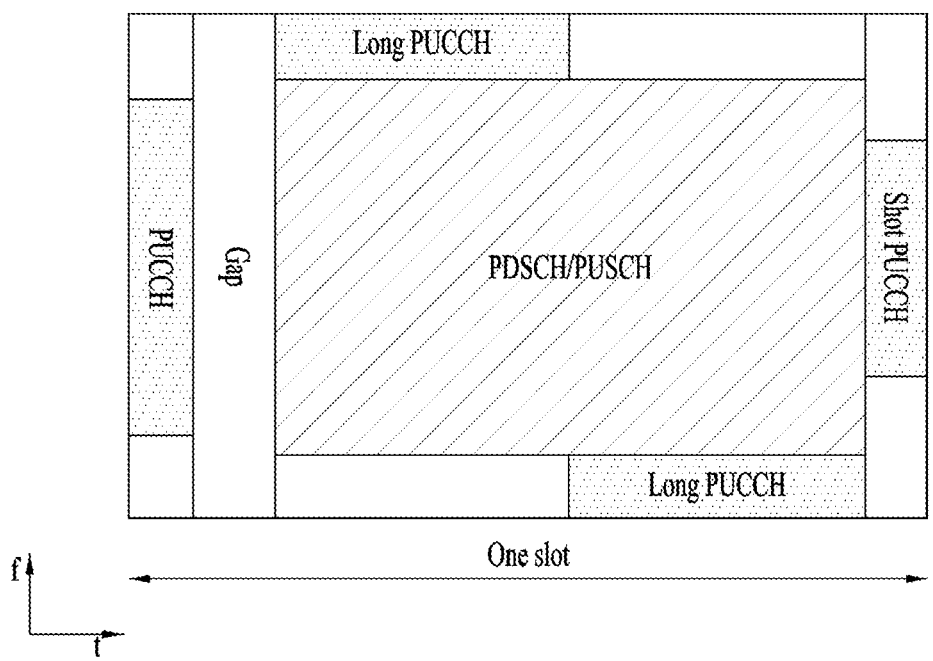
FIG. 5 is a diagram illustrating exemplary mapping of physical channels in a self-contained slot.

FIG. 5 is a diagram illustrating exemplary mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a predetermined coding rate according to a radio channel state. One CCE includes 6 resource element groups (REGs), each REG being defined by one OFDM symbol by one (physical) resource block ((P)RB)). The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined by 1, 2, 4, 8 or 16 CCEs according to an AL. The monitoring includes (blind) decoding of the PDCCH candidates. A set of PDCCH candidates decoded by the UE are defined as a PDCCH search space. The search space may be a common search space (CSS) or a UE-specific search space (USS). The UE may acquire DCI by monitoring PDCCH candidates in one or more search spaces configured by an MIB or higher-layer signaling. Each CORESET is associated with one or more search spaces, and each search space is associated with one CORESET. A search space may be defined based on the following parameters.

controlResourceSetId: A CORESET related to the search space.
monitoringSlotPeriodicityAndOffset: A PDCCH monitoring periodicity (in slots) and a PDCCH monitoring offset (in slots).
monitoringSymbolsWithinSlot: A PDCCH monitoring symbol (e.g., the first symbol(s) in the CORESET) in a PDCCH monitoring slot.
nrofCandidates: The number of PDCCH candidates for each AL={1, 2, 4, 8, 16} (one of 0, 1, 2, 3, 4, 5, 6, and 8).
An occasion (e.g., time/frequency resources) in which PDCCH candidates are to be monitored is defined as a PDCCH (monitoring) occasion. One or more PDCCH (monitoring) occasions may be configured in a slot.

Table 1 lists exemplary features of the respective search space types.

TABLE 1

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 2 lists exemplary DCI formats transmitted on the PDCCH.

TABLE 2

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level)

PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 3 illustrates exemplary PUCCH formats. PUCCH formats may be divided into short PUCCHs (Formats 0 and 2) and long PUCCHs (Formats 1, 3, and 4) based on PUCCH transmission durations.

TABLE 3

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

TABLE 3-continued

| PUCCH format | Length in OFDM symbols $N_{symb}^{PUCCH}$ | Number of bits | Usage | Etc |
| --- | --- | --- | --- | --- |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

When a packet is transmitted in a mobile communication system, signal distortion may occur during transmission since the packet is transmitted on a radio channel. To correctly receive a distorted signal, a receiver should correct the distortion of the transmitted signal based on channel information. To detect the channel information, a signal known to both a transmitter and the receiver is transmitted and the channel information is detected with a degree of distortion of the signal when the signal is received through a channel. This signal is called a pilot signal or a reference signal.

Further, when a packet is transmitted in a mobile communication system, a method of increasing data transmission/reception efficiency by adopting multiple transmission antennas and multiple reception antennas is used. When a transmitter or a receiver transmits or receives data through multiple antennas to increase capacity or performance, the receiver may receive a correct signal only when the receiver is aware of a channel state between each transmission antenna and each reception antenna from a reference signal (RS) provided for each transmission antenna.

In the mobile communication system, RSs may be classified into two types according to their purposes: RS for channel information acquisition and RS for data demodulation. Because the former is used for a UE to obtain DL channel information, it needs to be transmitted in a wide band, and even a UE that does not DL data in a specific subframe should be able to receive and measure the RS. This RS is also used for measurement as in a handover situation. The latter is transmitted along with corresponding resources by a BS, when the BS transmits a DL signal, and is used for a UE to demodulate data through channel measurement. This RS needs to be transmitted in a region carrying data.

Figure 6A:
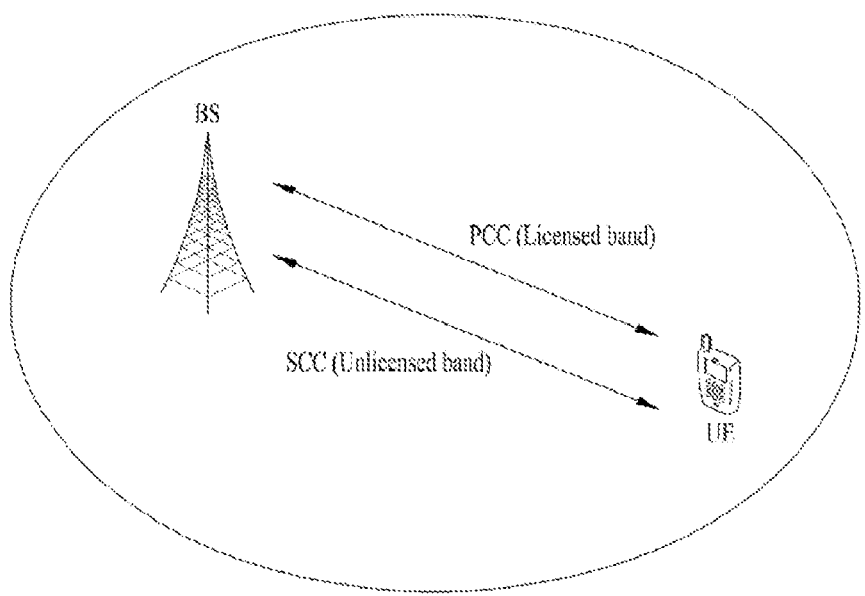
FIGS. 6A and 6B are diagrams illustrating a wireless communication system supporting an unlicensed band.
Figure 6B:
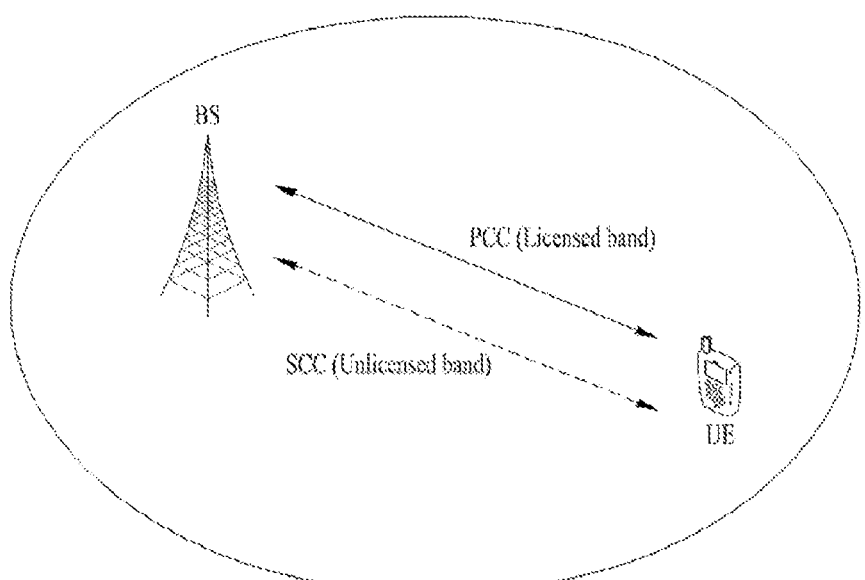

FIGS. 6A and 6B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation (CA) is supported, one UE may transmit and receive signals to and from a BS in a plurality of cells/carriers. When a plurality of CCs are configured for one UE, one CC may be configured as a primary CC (PCC) and the other CCs may be configured as secondary CCs (SCCs). Specific control information/channel (e.g., CSS PDCCH or PUCCH) may be configured to be transmitted and received only on the PCC. Data may be transmitted in the PCC/SCC. FIG. 6A illustrates signal transmission and reception between a UE and a BS in an LCC and a UCC (non-standalone (NSA) mode). In this case, the LCC may be configured as a PCC, and the UCC may be configured as an SCC. When a plurality of LCCs are configured for the UE, one specific LCC may be configured as a PCC, and the remaining LCCs may be configured as SCCs. FIG. 6A corresponds to licensed assisted access (LAA) of a 3GPP LTE system. FIG. 6B illustrates signal transmission and reception between a UE and a BS in one or more UCCs without any LCC (SA mode). In this case, one of the UCCs may be configured as a PCC, and the remaining UCCs may be configured as SCCs. Both the NSA mode and the SA mode may be supported in the unlicensed band of the 3GPP NR system.

According to regional regulations on an unlicensed band, a communication node should determine whether other communication node(s) is using a channel in the unlicensed band, before signal transmission. Specifically, the communication node may determine whether other communication node(s) is using the channel by performing carrier sensing (CS) before the signal transmission. When the communication node confirms that any other communication node is not transmitting a signal, this is defined as confirming clear channel assessment (CCA). In the presence of a CCA threshold predefined by higher-layer signaling (RRC signaling), when the communication node detects energy higher than the CCA threshold in the channel, the communication node may determine that the channel is busy, and otherwise, the communication node may determine that the channel is idle. For reference, the WiFi standard (e.g., 801.11ac) specifies a CCA threshold of −62 dBm for a non-WiFi signal and a CCA threshold of −82 dBm for a WiFi signal. When determining that the channel is idle, the communication node may start signal transmission in a UCell. The above-described series of operations may be referred to as a listen-before-talk (LBT) or channel access procedure (CAP). LBT and CAP may be interchangeably used.

The BS may perform one of the following unlicensed band access procedures (e.g., CAPs) to transmit a DL signal in the unlicensed band.

(1) First DL CAP Method

Figure 7:
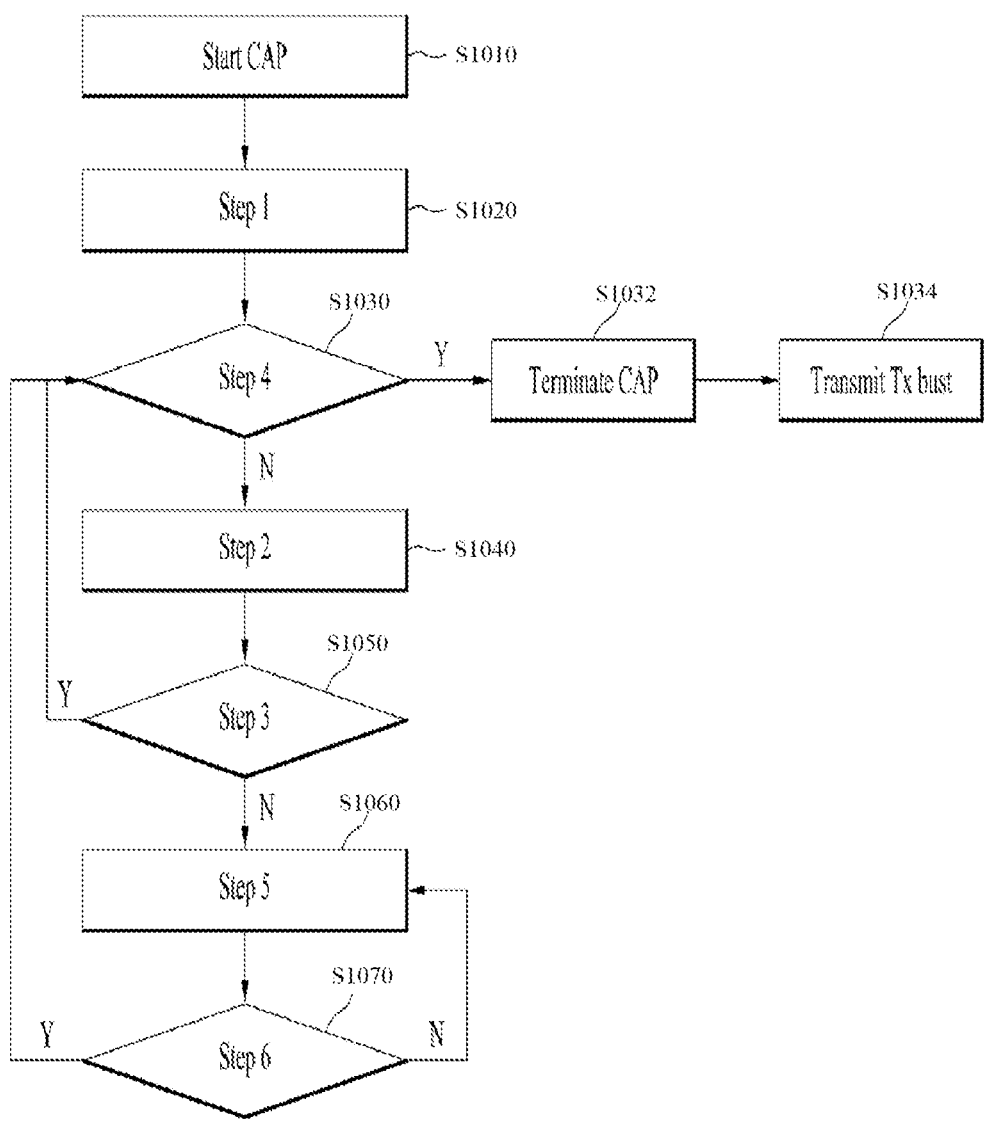
FIG. 7 is a flowchart illustrating a channel access procedure (CAP) for transmitting a downlink (DL) signal in an unlicensed band in a base station (BS)

FIG. 7 is a flowchart illustrating a DL CAP for DL signal transmission in an unlicensed band, performed by a BS.

For DL signal transmission (e.g., transmission of a DL signal such as a PDSCH/PDCCH/enhanced (EPDCCH)), the BS may initiate a CAP (S1010). The BS may randomly select a backoff counter N within a contention window (CW) according to step 1. N is set to an initial value $N_{init}$ (S1020). $N_{init}$ is a random value selected from the values between 0 and $CW_p$. Subsequently, when the backoff counter value N is 0 according to step 4 (S1030; Y), the BS terminates the CAP (S1032). The BS may then perform a Tx burst transmission including transmission of a PDSCH/PDCCH/EPDCCH (S1034). On the contrary, when the backoff counter value N is not 0 (S1030; N), the BS decrements the backoff counter value by 1 according to step 2 (S1040). Subsequently, the BS checks whether the channel of U-cell(s) is idle (S1050). If the channel is idle (S1050; Y), the BS determines whether the backoff counter value is 0 (S1030). On the contrary, when the channel is not idle, that is, the channel is busy (S1050; N), the BS determines whether the channel is idle during a longer defer duration $T_d$ (25 usec or longer) than a slot duration (e.g., 9 usec) according to step 5 (S1060). If the channel is idle during the defer duration (S1070; Y), the BS may resume the CAP. The defer duration may include a 16-usec duration and the immediately following $m_p$ consecutive slot durations (e.g., each being 9 usec). On the contrary, if the channel is busy during the defer duration (S1070; N), the BS re-checks whether the channel of the U-cell(s) is idle during a new defer duration by performing step S1060 again.

Table 4 illustrates that $m_p$, a minimum CW, a maximum CW, a maximum channel occupancy time (MCOT), and an allowed CW size applied to a CAP vary according to channel access priority classes.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$(=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 8:
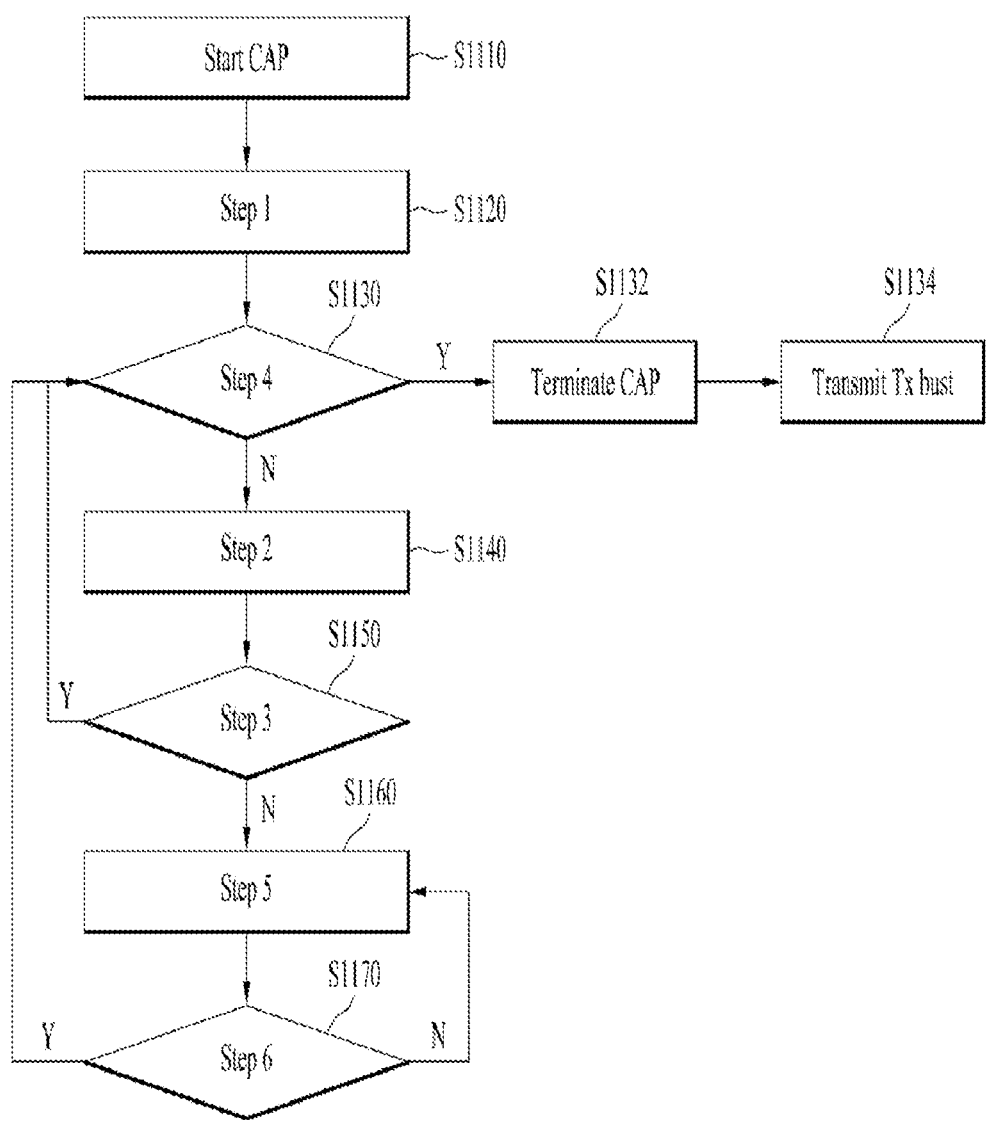
FIG. 8 is a flowchart illustrating a CAP for transmitting an uplink (UL) signal in an unlicensed band in a user equipment (UE)

FIG. 8 is a flowchart illustrating a Type 1 CAP for a UL signal transmission at a UE For a signal transmission in an unlicensed band, the UE may initiate the CAP (S1110). The UE may randomly select a backoff counter N within a CW according to step 1. N is set to an initial value $N_{init}$ (S1120). $N_{init}$ is a value selected randomly from among the values between 0 and $CW_p$. Subsequently, if the backoff counter value N is 0 according to step 4 (Y in S1130), the UE ends the CAP (S1132). Subsequently, the UE may perform a Tx burst transmission (S1134). On the other hand, if the backoff counter value is not 0 (N in S1130), the UE decrements the backoff counter value by 1 according to step 2 (S1140). Subsequently, the UE checks whether a channel of U-cell(s) is idle (S1150). If the channel is idle (Y in S1150), the UE checks whether the backoff counter value is 0 (S1130). On the contrary, if the channel is not idle in step S1250, that is, the channel is busy (N in S1150), the UE checks whether the channel is idle for a defer duration $T_d$ (25 usec or more) longer than a slot time (e.g., 9 usec) according to step 5 (S1160). If the channel is idle for the defer duration (Y in S1170), the UE may resume the CAP. The defer duration may span a period of 16 usec and the following $m_p$ consecutive slot durations (e.g., 9 usec). On the other hand, if the channel is busy for the defer duration (N in S1170), the UE re-performs S1160 to check again whether the channel is idle for a new defer duration.

Table 5 illustrates that $m_p$, a minimum CW, a maximum CW, an MCOT, and an allowed CW size for a CAP vary according to a channel access priority class.

TABLE 5

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

A CW size applied to the Type 1 UL CAP may be determined in various ways. For example, the CW size may be adjusted based on whether a new data indicator (NDI) value for at least one HARQ process related to the HARQ process ID, HARQ_ID_ref of a UL-SCH within a predetermined time period (e.g., a reference TU) is toggled. In the case where the UE performs a signal transmission on a carrier by using a Type 1 CAP related to a channel access priority class p, when an NDI value for at least one HARQ process related to HARQ_ID_ref is toggled, the UE sets $CW_p=CW_{min,p}$ for all priority classes p∈{1, 2, 3, 4}. Otherwise, the UE increments CWp for all priority classes p∈{1,2,3,4} to the next higher allowed value.

(2) Type 2 UL CAP Method

When the UE uses the Type 2 CAP for a UL signal transmission (e.g., transmission of a signal including a PUSCH) in an unlicensed band, the UE may transmit the UL signal (e.g., the signal including a PUSCH) in the unlicensed band immediately after the UE sense that a channel is idle at least for a sensing interval $T_{short\_ul}$=25 us. $T_{short\_ul}$ includes a duration of $T_f$(=16 us) immediately followed by one slot duration $T_{sl}$=9 us. $T_f$ includes an idle slot duration $T_{sl}$ at the start of $T_f$.

The present disclosure proposes a method of transmitting data in a plurality of transmission time intervals (TTIs) or a plurality of slots in an unlicensed band by a UE in a wireless communication system including BSs and UEs. A TTI or a slot is a basic time resource unit for data scheduling. A single TTI or slot may include a plurality of (OFDM) symbols.

The 3GPP standardization organization has been working on standardization of a 5G wireless communication system known as New RAT (hereinafter, referred to as NR). The NR system seeks to support a plurality of logical networks in a single physical system. Therefore, the NR system is designed to support services having various requirements (e.g., eMBB, mMTC, and URLLC) by changing a TTI and an OFDM numerology (e.g., an OFDM symbol duration and an SCS). Along with the rapid growth of data traffic due to the recent emergence of smart devices, a method of using a U-band in cellular communication is also considered for the 3GPP NR system, similarly to LAA/enhanced LAA (eLAA) in the legacy 3GPP LTE system. Unlike LAA/eLAA, an NR cell of an unlicensed band (hereinafter, referred to as NR U-cell) aims to support a standalone operation. For example, PUCCH and PUSCH transmissions from a UE may be supported.

The present disclosure proposes a method of supporting multi-TTI scheduling that schedules data transmission in a plurality of TTIs or a plurality of slots in an NR U-cell by a scheduling indication (in a single DCI or PDCCH). It may be assumed that a plurality of scheduled TTIs or slots are consecutively allocated. While the proposed operations of the present disclosure are described as embodiments for the NR system, the present disclosure may be extended to any wireless communication system supporting multi-TTI scheduling. In the following description, the starting TTI or starting slot of the plurality of scheduled TTIs or slots may be determined based on information included in a PDCCH (e.g., when delay information included in DCI is '4', slot #n+4 may be determined as the starting slot based on slot #n carrying the PDCCH). In another example, a predefined slot may be determined as the starting slot. Further, it is assumed in the following description that the number of a plurality of TTIs or slots scheduled for a PDSCH (or PUSCH) is given by a PDCCH, higher-layer signaling (e.g., RRC signaling), or any other predefined criterion.

[Proposed Method #1] Method of Allocating Time Resources on a TTI Basis

In an NR system according to an embodiment of the present disclosure, a BS uses a start-length resource indication value (SLIV) scheme to allocate time resources to a PDSCH (or PUSCH) in a single slot or TTI. An SLIV is a specific value indicating a combination of the index of a starting symbol and the number of consecutive symbols allocated for data transmission from the starting symbol (the length of time resources for the data transmission) in a slot or TTI, in resource allocation to a PDSCH (or PUSCH) in the time domain.

Figure 9:
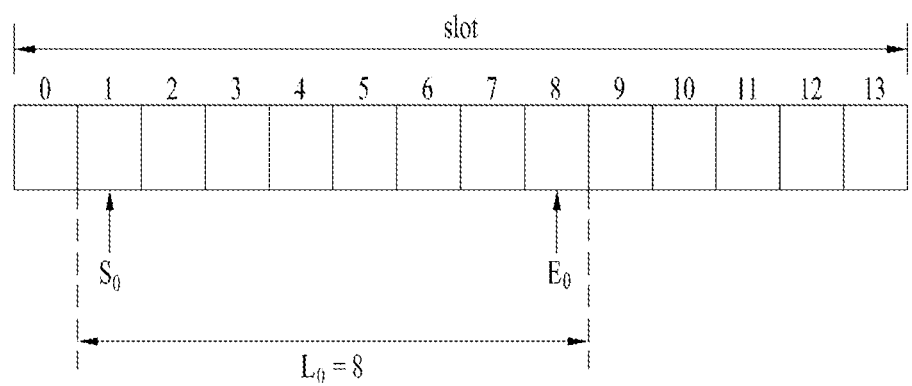
FIGS. 9 to 16 are diagrams illustrating embodiments of the present disclosure.

For example, referring to FIG. 9, since a starting symbol and a length in a single slot (or a single TTI) are indicated, index 0 to index 13 are available as the index of the starting symbol because there are a total of 14 symbols from index 0 to index 13 in one slot. Further, the maximum length of symbols for data transmission in one slot is 14. Therefore, if S0=0, available L0 values range from 1 to 14 (L0>=1). Alternatively, when L0 is set to a value of 0 or larger, L0 may be 0 to 13. In the NR system, the SLIV may be expressed as an integer of 0 to 127, corresponding to a combination of {S0, L0} where S0 represents a starting symbol and L0 represents a length.

Once S0 and L0 for one slot are given, the ending symbol E0 of the data transmission may be known. For example, if S0=1 and L0=8 (L0>=1), then E0=8. That is, E0=S0+L0−1 (L0>=1). If L0 is set to a value of 0 or larger, E0=S0+L0.

Therefore, conventionally, when an SLIV value corresponding to {S0, L0} is indicated for a single slot, the UE transmits or receives data in as many consecutive symbols as L0 from a symbol index S0 in the slot.

In view of the nature of a U-band in which LBT is performed for data transmission, multi-TTI scheduling for a plurality of TTIs is considered in embodiments of the present disclosure. Therefore, when multi-TTI scheduling is indicated, extension of the legacy SLIV scheme for allocating time resources in a single slot/single TTI to a scheme of allocating time resources in a plurality of slots should be considered.

In the present disclosure, it is proposed that when a BS indicates data scheduling in a plurality of TTIs or slots to a UE, time resources for data transmission in the plurality of TTIs or slots are allocated/interpreted in one or more of the following methods.

(1) Opt. 1-1

A. When the BS indicates a single combination (e.g., {S0, L0}) of the index of a starting symbol and the length of time resources (i.e., the number of consecutive symbols from the starting symbol) for data transmission, the UE may interpret the information as follows.

i. It may be interpreted that as many (consecutive) time resources as the length L0 from the symbol index S0 have been allocated in each TTI.

ii. It may be assumed that a PDSCH (or PUSCH) transmission is performed on a TTI basis within the time resources.

Figure 10:
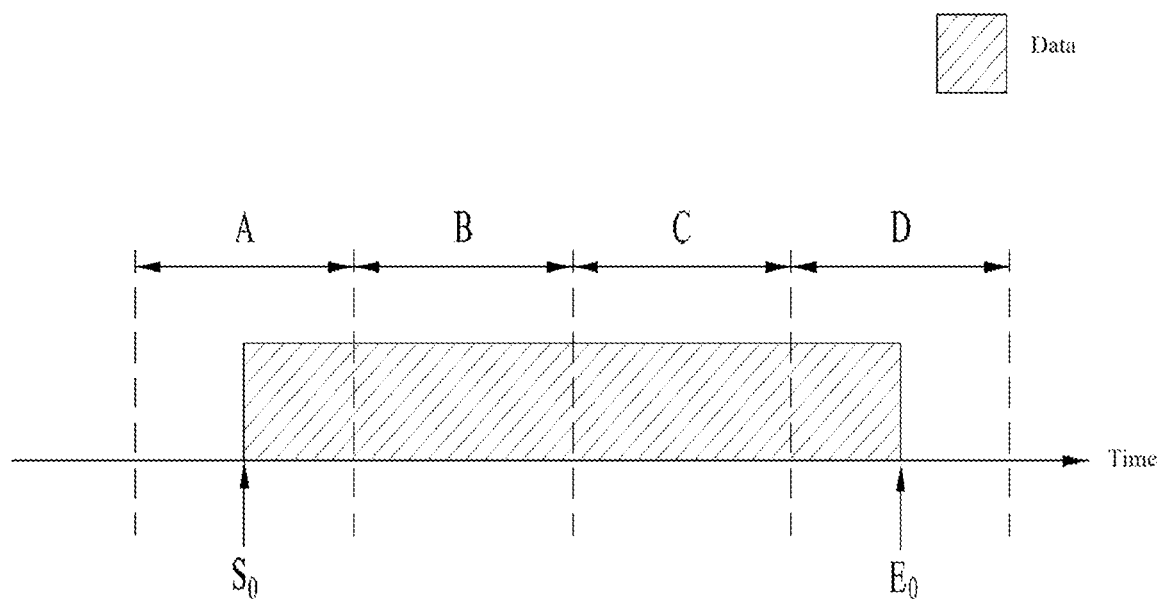

For example, referring to FIG. 10, let a plurality of consecutive TTIs scheduled to the UE be denoted by A, B, C, and D. When the BS indicates a single combination {S0, L0} to the UE, it may be considered that as many time resources as the length L0 from the symbol index S in each of the starting (first) TTI A and the following TTIs B, C and D have been allocated to the UE. It may be considered that the allocated time resources are contiguous as long as L0 in each TTI and non-contiguous between TTIs. That is, the UE may receive a PDSCH or transmit a PUSCH during the duration of L0 starting from symbol S0 in each of the plurality of scheduled TTIs. In the NR system, a URLLC transmission is performed by puncturing resources of a pre-scheduled DL data transmission. Therefore, the pre-scheduled DL data may be lost more or less. According to option 1-1, since non-contiguous resources are allocated for data transmission and reception in a plurality of TTIs in the U-band, the URLLC transmission during a time period without mapped data may minimize the loss of the pre-scheduled data.

(2) Opt. 1-2

A. When the BS indicates a single combination (e.g., {S0, L0}) of the index of a starting symbol and the length of time resources (i.e., the number of consecutive symbols from the starting symbol) for data transmission, the UE may interpret the information as follows.

i. If L0 is a positive number, it may be interpreted that (contiguous) time resources from S0 in the first TTI to E0 in the last TTI have been allocated.

ii. If L0 is a negative number, it may be interpreted that (contiguous) time resources from E0 in the first TTI to S0 in the last TTI have been allocated.

iii. E0 may be calculated by E0=S0+|L0| or E0=S0+|L0|−1 (that is, E0 may be calculated by using the absolute value of L0, regardless of whether L0 is negative or positive). If L0 is positive, E0 may represent the index of an ending symbol in the last TTI, and if L0 is negative, E0 may represent the index of the starting symbol in the first TTI.

iv. It may be assumed that a PDSCH (or PUSCH) transmission is performed on a TTI basis within the time resources.

In the case of {S0, L0} in a single slot, L0 may not be a negative value. For a plurality of slots, however, L0 may not be interpreted as the length of time resources in one slot. Therefore, L0 may be a negative value.

Therefore, according to option 1-2, if L0 is given as a positive value, {S0, L0} may be interpreted in the same manner as in option 1-1, and if L0 is given as a negative value, the meanings of E0 and S0 may be exchanged.

Figure 11A:
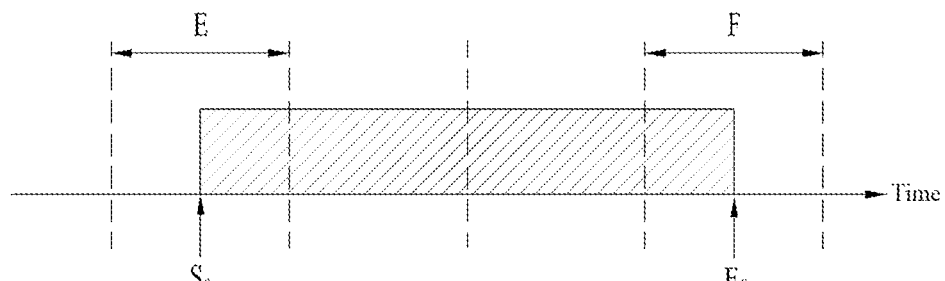
Figure 11B:
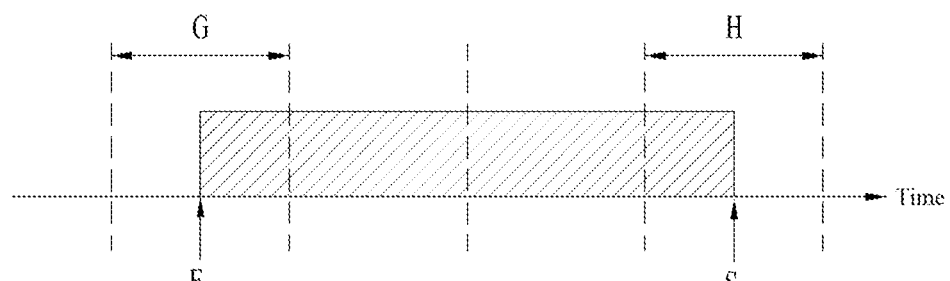

FIG. 11A illustrates that when L0 is a positive number, time resources from the symbol index S0 in the first TTI E to the symbol index E0 in the last TTI F have been allocated. FIG. 11B illustrates that when L0 is a negative number, time resources from the symbol index E0 in the first TTI F to the symbol index S0 in the last TTI H have been allocated.

(3) Opt. 1-3

A. When the BS indicates a single combination (e.g., {S0, L0}) of the index of a starting symbol and the length of time resources for data transmission and mirroring information (e.g., on/off), the UE may interpret the information as follows.

i. When mirroring is 'off', it may be interpreted that (contiguous) time resources from S0 in the first TTI to E0 in the last TTI have been allocated.

ii. When mirroring is 'on', it may be interpreted that (contiguous) time resources from E0 in the first TTI to S0 in the last TTI have been allocated.

iii. E0 may be calculated by S0+L0 or S0+L0-1. Further, if mirroring is 'off', E0 may mean the index of an ending symbol in the last TTI, and if mirroring is 'on', E0 may mean the index of the starting symbol in the first TTI.

iv. It may be assumed that a PDSCH (or PUSCH) transmission is performed on a TTI basis within the time resources.

According to option 1-3, the BS may add a 1-bit indication of on/off as mirroring information in addition to an {S0, L0} combination.

According to option 1-3, the same time resource allocation result as in option 1-2 may be derived using the additional 1 bit, with L0 indicated as a positive value.

FIGS. 11A and 11B may be applied to a method of allocating time resources in a plurality of TTIs according to mirroring on/off. FIG. 11A illustrates that when mirroring is 'off', time resources from the symbol index S0 in the first TTI E to the symbol index E0 of the last TTI F have been allocated. FIG. 11B illustrates that when mirroring is 'on', time resources from the symbol index E0 of the first TTI G to the symbol index S0 of the last TTI H have been allocated.

The BS may indicate mirroring on/off information by adding 1 bit. For example, the BS may indicate mirroring on or off by using a bit value of '0' or '1'.

(4) Opt. 1-4

A. When the BS indicates N combinations for N TTIs, each combination being the index of a starting symbol and the length of time resources for data transmission (e.g. {S0, L0}, {S1, L1}, ..., {SN−1, LN−1}), the UE may interpret the information as follows.

i. It may be interpreted that (contiguous) time resources of a length Ln from Sn (n=0, 1, ..., N−1) have been allocated in each $n^{th}$ TTI.

ii. It may be assumed that a PDSCH (or PUSCH) transmission is performed on a TTI basis within the time resources.

Compared to other options in which one SLIV is applied commonly to a plurality of TTIs, option 1-4 is a method of indicating an SLIV corresponding to each of a plurality of scheduled TTIs to the UE. Despite the benefit of flexible scheduling for each TTI, option 1-4 may increase the overhead of scheduling information in view of the indication of as many SLIVs as the number of TTIs.

(5) Opt. 1-5

A. When the BS indicates a single combination (e.g., {S0, L0}) of the index of a starting symbol and the length of time resources for data transmission, the UE may interpret the information as follows.

i. It may be interpreted that as many time resources as a multiple of the length L0 from the symbol index S0 in the first TTI have been allocated.

ii. It may be assumed that a PDSCH (or PUSCH) transmission is performed on an L0 unit basis within the time resources.

Figure 12:
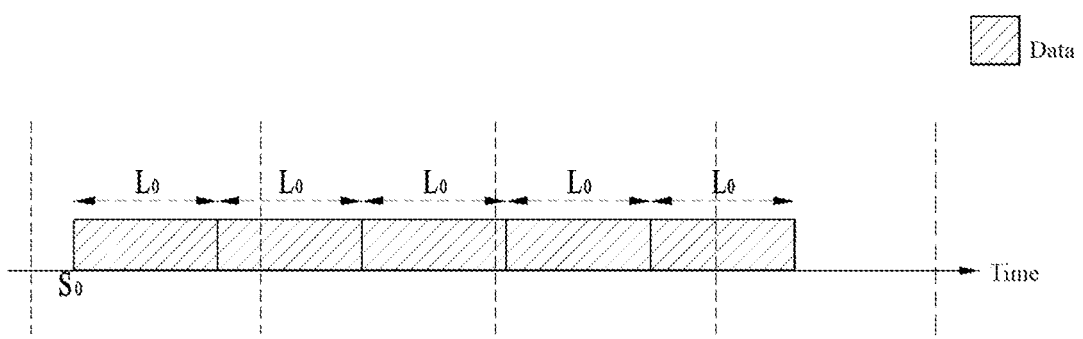

For example, referring to FIG. 12, it may be interpreted that data is transmitted/received in as many time resources as a multiple of L0 from a starting symbol index S0 in a scheduled first TTI. Information about the multiple (e.g., N) may be indicated to the UE, together with information about the number of a plurality of scheduled TTIs or slots (e.g., on a PDCCH, by RRC signaling, or according to a predefined criterion).

According to option 1-5, it may be interpreted that data is transmitted in as many time resources as a multiple of L0 from the starting symbol index S0 in the scheduled first TTI, without calculation of E0 in the scheduled last TTI.

(6) Opt. 1-6

A. When the BS indicates a single combination (e.g., {S0, L0}) of the index of a starting symbol and the length of time resources for data transmission, the UE may interpret the information as follows.

i. It may be interpreted that (contiguous) time resources from S0 in the first TTI to E0 in the last TTI have been allocated.

ii. E0 represents the index of an ending symbol, and may be calculated by E0=(S0+L0) mod S where S is related to the number of symbols in a slot or TTI, and may represent the total or maximum number of symbols in the slot or TTI. A value of 'S0+L0' equal to or larger than S may be allocated. For example, in the case of a legacy SLIV applied to a single slot, since S0 and E0 are located in the same slot, the value of 'S0+L0' may not exceed the total number of symbols in the single slot. However, since the SLIV is applied to a plurality of TTIs in the present disclosure, E0 and S0 may be located in different TTIs. Therefore, the value of 'S0+L0' may exceed the total number of symbols in a single TTI.

iii. It may be assumed that a PDSCH (or PUSCH) transmission is performed on a TTI basis in the time resources.

Option 1-6 may serve as a scheme of signaling an E0 value smaller than an S0 value, when a plurality of TTIs or slots are scheduled. An ending symbol may not precede a starting symbol in one slot. That is, the index E0 of the ending symbol in one slot may not be less than the index S0 of the starting symbol in the slot.

However, since a plurality of TTIs or a plurality of slots may be configured for data transmission to provide a plurality of LBT opportunities in the U-band, S0 and E0 may be located in different TTIs or slots. Therefore, since the index E0 in one slot may be smaller than the index S0 located in another slot, there is a need for a method of signaling an E0 value smaller than an S0 value.

For example, if S=14, S0=7, and L0=8, E0=1 according to the formula in option 1-6. Therefore, E0 smaller than S0 may be signaled according to option 1-6.

The BS may support one or more of the above options, and indicate information about an actually used option to the UE by a higher-layer signal (e.g., RRC signal) and/or DCI. However, when the BS indicates one or more combinations to the UE, each combination being the index of a starting symbol and the length of time resources for data transmission, the BS may configure combination candidates by higher-layer signaling such as RRC signaling and then indicate one candidate of the combination candidates by DCI. The total number of TTIs from the first TTI to the last TTI may be predetermined or configured by separate signaling (e.g., DL grant DCI).

The above options are summarized as follows.

When the BS indicates a single combination of the index of a starting symbol and a data transmission length (e.g., {S0, L0}), the UE may interpret the combination as allocation of as many time resources as a length L0 from a starting symbol S0 for data transmission and reception in each of a plurality of scheduled TTIs (option 1-1).

Conventionally, the index of the ending symbol and the index of the starting symbol according to an SLIV are values for data transmission in the same slot or TTI. Therefore, the relationship that the index of the ending symbol>the index of the starting symbol is established. However, in the extended resource allocation scheme for multi-TTI scheduling, the index of the starting symbol is applied only to the first TTI and the index of the ending symbol is applied only to the last TTI. Accordingly, the relationship that the index of the ending symbol≤the index of the starting symbol may also be established. To represent the relationship in the SLIV scheme according to an embodiment of the present disclosure, it may be considered that L0 having a negative value is indicated (option 1-2), or the index of the starting symbol and the index of the ending symbol are to the last TTI and the first TTI, respectively by a mirroring operation (option 1-3).

As a more generalized method, the BS may indicate N combinations for N TTIs, each combination being the index of a starting symbol and a data transmission length (e.g., {S0, L0}, {S1, L1}, . . . , {SN-1, LN-1}) (option 1-4). The BS may configure combination candidates by higher-layer signaling such as RRC signaling and then indicate one combination candidate of the combination candidates by DCI.

Proposed method #1 may be applied in combination with other proposed methods of the present disclosure, unless contradicting each other.

Figure 13:
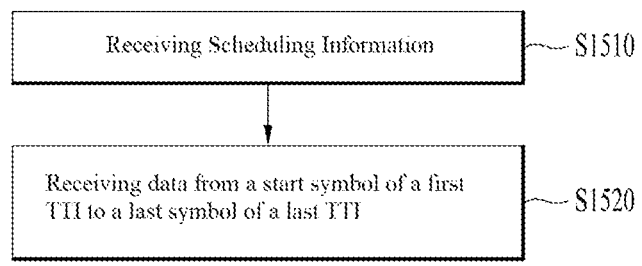

With reference to FIG. 13, an embodiment of proposed method #1 will be described below from the perspectives of the BS and the UE.

The UE may receive scheduling information for a plurality of consecutive TTIs from the BS (S1510). The scheduling information may include a combination of a first symbol index and the number of consecutive symbols. The combination of the first symbol index and the number of consecutive symbols may be determined based on a single TTI. That is, the scheduling information may include an SLIV value for a single TTI or a combination {S0, L0} corresponding to the SLIV value.

The UE may transmit or receive data based on the scheduling information (S1520). For example, the UE may receive a PDSCH in a starting symbol in a first TTI to an ending symbol in a last TTI among the plurality of consecutive TTIs. Alternatively, the UE may transmit a PUSCH in the starting symbol in the first TTI to the ending symbol in the last TTI among the plurality of consecutive TTIs.

The scheduling information may include information about the number of TTIs and the position of the first TTI among the plurality of TTIs.

Further, the scheduling information may include the combination of the first symbol index and the number of consecutive symbols, for data transmission and reception, and the number of the plurality of consecutive TTIs. For example, the BS may transmit an SLIV value representing {S0, L0}, the number of TTIs, and the position of the first of the plurality of TTIs to the UE by DL grant DCI.

The BS may allocate time resources for data transmission/reception in the starting symbol in the first TTI to the ending symbol in the last TTI among the plurality of TTIs based on the scheduling information.

According to an embodiment of the present disclosure, the index of the starting symbol in the first TTI and the index of the ending symbol in the last TTI through which the UE transmits and receives data may be determined in various methods.

For example, according to option 1-6, the index of the starting symbol in the first TTI may be determined as S0, and the index of the ending symbol in the last TTI may be determined by a modulo operation of S0, L0, and the total number of symbols in a single TTI. If the total number of symbols in a single TTI is 14, the index of the ending symbol in the last TTI may be determined as '(S0+L0) mod 14'.

According to option 1-3, 1-bit side information may further be included in the scheduling information.

The 1-bit side information may have two bit values, a first value and a second value, for example, '0' and '1'. Mirroring information for mirroring on/off may be indicated by the two bit values.

When the side information bit has the first value, that is, mirroring 'off', the index of the starting symbol in the first TTI may be determined as S0, and the index of the ending symbol in the last TTI may be determined as E0. E0 may be determined as 'S0+L0–1'.

When the side information bit has the second value, that is, mirroring 'on', the symbol indexes as used in the above case may be exchanged. That is, the index of the starting symbol in the first TTI may be determined as E0, and the index of the ending symbol in the last TTI may be determined as S0. E0 may be determined as 'S0+L0–1'.

[Proposed Method #2] Method of Determining a Transport Block Size (TBS)

When the BS indicates data scheduling in a plurality of TTIs or slots to the UE, and when the BS determines a TBS based on a modulation and coding scheme (MCS) and the number $N_{RE}$ of REs available for data allocation in a PDSCH (or PUSCH), a TBS may be allocated (on a TTI basis) for the plurality of TTIs or slots for data transmission in one or more of the following methods.

(1) Opt. 2-1: A TBS is determined (for each TTI) according to $N_{RE}$ in a PDSCH (or PUSCH) transmission period of each TTI.

A. However, $N_{RE}$ may be calculated as follows.
    i. $N_{RE}=N_{SC}*N_{SYMB}-N_{DMRS}+N_{OH}$
      1. $N_{SC}$: The number of subcarriers allocated as PDSCH (or PUSCH) transmission resources
      2. $N_{SYMB}$: The number of symbols allocated as PDSCH (or PUSCH) transmission resources
      3. $N_{DMRS}$: The number of REs for DM-RS transmission in PDSCH (or PUSCH) transmission resources
      4. $N_{OH}$: The number of REs used to reflect overhead, configured by a higher-layer signal (e.g., RRC signal)
    ii. The value of $N_{OH}$ may be independently set and applied on a TTI basis (or on a transmission type basis (e.g., partial TTI or full TTI) in a TTI).
    iii. $N_{SC}$ and/or $N_{SYMB}$ may be determined based on scheduled PDSCH (or PUSCH) transmission resources regardless of actual transmission. Alternatively, when some symbol(s) in the PDSCH (or PUSCH) transmission resources (scheduled) by LBT is punctured, the symbol(s) may still be included in $N_{SYMB}$, whereas when the symbol(s) is rate-matched, the symbol(s) may be excluded from $N_{SYMB}$.

For example, a TBS is calculated to calculate resources instantaneously in the NR system. In this case, the TBS is calculated based on a single TTI. In the present disclosure, the TBS may be calculated in consideration of the characteristics of a U-band in which a plurality of TTIs may be configured.

Referring to FIG. 13, TTIs J, K, and L, each having all symbols continuously allocated for data transmission, may be referred to as full TTIs. A TTI with some symbols allocated for data transmission may be referred to as a partial TTI. Thus, TTIs I and M in which data transmission starts or ends in the middle may be partial TTIs. The TTIs I and M may be the first TTI and the last TTI, respectively. The first and last ones of a plurality of consecutive TTIs may be full TTIs, not necessarily partial TTIs.

Two LBT opportunities may be available in the first TTI I because two starting symbol candidates x and y for data transmission are signaled. Although the data transmission actually starts in the symbol y due to successful LBT, if the starting symbol of the scheduled PDSCH (or PUSCH) transmission is x, $N_{SYMB}$ may be determined based on x regardless of the actual transmission.

(2) Opt. 2-2: A (single) TBS is determined based on $N_{RE}$ in a PDSCH (or PUSCH) transmission period within a (reference) TTI.

A. A (reference) TTI among scheduled TTIs may be selected as one of the following TTIs.
  i. Opt. 2-2-1: First TTI
  ii. Opt. 2-2-2: Last TTI
  iii. Opt. 2-2-3: Partial TTI
  iv. Opt. 2-2-4: Full TTI
  v. Opt. 2-2-5: TTI with a minimum scheduled PDSCH (or PUSCH) transmission period
  vi. Opt. 2-2-6: TTI with a maximum scheduled PDSCH (or PUSCH) transmission period B. The (single) TBS may be equally applied to a PDSCH (or PUSCH) in each of the plurality of TTIs.

For example, resources such as the number of symbols carrying data in a TTI may be different depending on whether the TTI is a full TTI, a partial TTI, a first TTI, or a last TTI. Accordingly, one TTI may be selected as a reference TTI, and a TBS calculated based on the reference TTI may be applied commonly to the other TTIs according to option 2-2. The reference TTI may be selected according to option 2-2-1 to option 2-2-6.

(3) Opt. 2-3: A (single) TBS is determined according to $N_{RE}$ based on the transmission length L of a (single) PDSCH (or PUSCH), indicated by the BS.

A. A PDSCH (or PUSCH) may be transmitted in an L-symbol unit, and a plurality of PDSCHs (or PUSCHs) may be transmitted in a plurality of (consecutive) L-symbol units, with a TTI (or slot) boundary ignored.

B. The (single) TBS may be applied commonly to a PDSCH (or PUSCH) in each of the plurality of L-symbol units.

Given $N_{RE}$ a TBS may be expressed as $N_{info}=N_{RE}*R*Qm*v$ where R, Qm, and v are a coding rate, a modulation order, and the number of layers, respectively.

However, a plurality of TBs may be transmitted on each PDSCH (or PUSCH).

As described above, a full TTI refers to a TTI with all symbols carrying data, and a partial TTI refers to a TTI with some (consecutive) symbol(s) carrying data at the beginning (or end) thereof.

However, an RE may refer to transmission resources corresponding to a {OFDM symbol, subcarrier} combination in an OFDM transmission scheme.

However, the TBS determination method may be applied only to initially transmitted TBs (i.e., not applied to retransmission TBs).

The above-described options 2-1 to 2-3 are summarized as follows.

In the NR system according to the embodiment of the present disclosure, the number of REs available for PDSCH (or PUSCH) transmission may be calculated, and a TBS to be transmitted on a PDSCH (or PUSCH) may be calculated by reflecting a coding rate, a modulation order, and the number of layers in the number of REs. Even when multi-TTI scheduling is introduced to the NR U-band, the UE may calculate the TBS of each PDSCH (or PUSCH) transmitted in each of a plurality of TTIs based on the number of REs available for the PDSCH (or PUSCH) in a similar manner to the above method (option 2-1). In this case, the BS may indicate a coding rate and a modulation order to be commonly applied to the plurality of TTIs by an MCS field. However, more characteristically in the NR-U band, it may occur that some (OFDM) symbols of PDSCH (or PUSCH) transmission resources scheduled by an LBT operation are punctured/rate-matched. In this case, it is necessary to consider how to reflect the symbols in calculating a TBS. The number of available REs and a TBS may always be calculated simply based on the number of symbols in (scheduled) PDSCH (or PUSCH) transmission resources. Alternatively, if some (OFDM) symbols of PDSCH (or PUSCH) resources are punctured, the punctured symbols may still be counted as the number of symbols in the TBS calculation formula, expecting that there will be no change in a TBS because TBs are not newly configured. On the contrary, if some (OFDM) symbols of PDSCH (or PUSCH) resources are rate-matched, the rate-matched symbols may be excluded from the number of symbols in the TBS calculation formula, because TBs may be newly configured.

In another method, when TTI types are divided into partial TTI or full TTI in a multi-TTI transmission, a (single) TBS may be calculated on the assumption of one of the partial TTI or the full TTI, and the calculated (single) TBS may be applied commonly to the plurality of TTIs (option. 2-2). Alternatively, when the BS indicates PDSCH (or PUSCH) scheduling in a certain time unit by an SLIV scheme or the like, PDSCH(s) (or PUSCH(s)) may be transmitted in repetitions of the time unit regardless of TTI boundaries, and a TBS may be determined based on the number of available REs in the time unit (option 2-3).

Proposed method #2 may be applied in combination with other proposed methods of the present disclosure, unless contradicting each other.

[Proposed Method #3] Method of Determining a Data Mapping Type

When the BS indicates data scheduling in a plurality of TTIs or slots to the UE, and when the BS indicates a data mapping type for a PDSCH (or PUSCH), data mapping types may be allocated to the plurality of TTIs or slots for data transmission and reception in one or more of the following methods.

(1) Opt. 3-1: The plurality of TTIs are divided into two groups A and B. A data mapping type for one of the two groups is indicated by DCI, and a data mapping type for the other group is predetermined or configured by a higher-layer signal.

A. Opt. 3-1-1: Group A=partial TTI(s), Group B=full TTI(s)
B. Opt. 3-1-2: Group A=first/Last TTI, group B=middle TTI(s)
C. Opt. 3-1-3: Group A=first TTI, group B=other TTI(s)

(2) Opt. 3-2: The TTIs are divided into two groups A and B, candidates for a data mapping type combination for the two groups are configured by a higher layer, and one of the candidates is indicated by DCI.
A. Opt. 3-2-1: Group A=partial TTI(s), Group B=full TTI(s)
B. Opt. 3-2-2: Group A=first/Last TTI, group B=middle TTI(s)
C. Opt. 3-2-3: Group A=first TTI, group B=other TTI(s)

(3) Opt. 3-3: Candidates for a data mapping type combination for a plurality of TTIs are configured by a higher layer, and one of the candidates is indicated by DCI.

As described above, a TTI with all symbols continuously allocated for data transmission may be referred to as a full TTI, and a TTI with some symbols allocated for data transmission may be referred to as a partial TTI.

That is, a TTI with all symbol(s) carrying data, such as the TTIs J, K and L, may be a full TTI, and a TTI with some (consecutive) symbol(s) carrying data at the beginning (or end), such as the TTIs I and M, may be a partial TTI.

The TTIs I and M may be the first TTI and the last TTI, respectively. The first and the last ones of the plurality of consecutive TTIs may be full TTIs, not necessarily partial TTIs. A middle TTI refers to a TTI other than the first TTI and the last TTI.

Considering unlicensed-band LBT in the NR U-band according to an embodiment of the present disclosure, transmitting data in available contiguous time resources may be favorable in terms of channel occupancy during multi-TTI scheduling. Most of a plurality of TTIs may be full TTIs each with all symbols carrying data, whereas only the first and last ones of the TTIs may be partial TTIs each with some consecutive symbol(s) carrying data at the beginning (or end).

Therefore, when continuous data transmission over a plurality of TTIs is assumed, a middle TTI may be a full TTI. The first TTI and the last TTI may be full TTIs or partial TTIs.

A data mapping type may mean a DM-RS transmission symbol position within a TTI, when a PDSCH (or PUSCH) is transmitted. For example, the following data mapping types may be considered.

Data mapping type A: DM-RS transmission in the $3^{rd}$ or $4^{th}$ symbol in a TTI
Data mapping type B: DM-RS transmission in the first symbol of a PDSCH (or PUSCH) transmission period In the LTE system, for example, there is no defined data mapping type for the PDSCH or the PUSCH, and the DM-RS is located at a fixed symbol position. Compared to the LTE system, there are two data mapping types, type A and type B in the NR system.

Data mapping type A may mean a type in which the DM-RS is transmitted in a fixed symbol within a TTI or slot. Data mapping type B may mean a type in which the DM-RS is transmitted in the first symbol of a PDSCH or PUSCH transmission period.

That is, when the PDSCH (or PUSCH) is transmitted, data mapping type information that defines a relative transmission position of the DM-RS may be indicated to the UE in the NR system. For example, data mapping type A in which the DM-RS is transmitted in the third or fourth symbol of a slot (or TTI) and data mapping type B in which the DM-RS is transmitted in the first symbol of a PDSCH (or PUSCH) transmission period may be supported.

In the NR system, a data mapping type may be indicated together with an SLIV by DCI, when time resources are allocated to the PDSCH or the PUSCH.

Specifically, a time resource allocation for the PDSCH may be indicated as {k0, data mapping type, SLIV} by DCI, and a time resource allocation for the PUSCH may be indicated as {k2, data mapping type, SLIV} by DCI. Herein, k0 is an offset (the number of TTIs or slots) related to a time until the UE receives the PDSCH after receiving a PDCCH including DL allocation information, and k2 is an offset related to a time until the UE transmits the PUSCH after receiving a PDCCH including a UL grant. The SLIV indicates a starting symbol and a data transmission length for resource allocation in the time domain, as described before.

For example, upon receipt of DCI, the UE may receive a PDSCH based on a data mapping type during a time period indicated by an SLIV, starting from a starting symbol indicated by the SLIV in a slot spaced from a slot in which the DCI has been received by k0.

For example, upon receipt of DCI, the UE may transmit a PUSCH based on a data mapping type during a time period indicated by an SLIV, starting from a starting symbol indicated by the SLIV in a slot spaced from a slot in which the DCI has been received by k2.

The above examples are for one TTI. Since the embodiment of the present disclosure is based on multi-TTI scheduling, it is necessary to consider how to configure a data mapping type for each TTI in the case of multi-TTI scheduling. The above options propose how to signal a data mapping type, when a plurality of TTIs or a plurality of slots are configured for transmission/reception of a PDSCH or a PUSCH.

Conventionally, time resources are allocated in the structure of 1 slot-1 SLIV-1 data mapping type. However, when N multiple TTIs or N multiple slots are configured, a data mapping type for one TTI or one slot is not indicated repeatedly N times. Rather, the multiple TTIs or slots may be grouped, and the same data mapping type may be applied to the TTIs of the same group. The number of scheduled TTIs is larger than the number of groups.

In one method, TTIs may be divided into a partial TTI group and a full TTI group according to data transmission schemes within the TTIs. A data mapping type for one of the two groups may be indicated by DCI, while a data mapping type for the other group may be predefined or configured by a higher-layer signal. For example, data mapping type A may be pre-agreed or configured by a higher-layer signal, for the full TTIs, and data mapping type A or B may be dynamically indicated for the partial TTIs by DCI. On the contrary, data mapping type B may be pre-agreed for application to the partial TTIs, and data mapping type A or B may be dynamically indicated for the full TTIs by DCI (option 3-1).

For example, option 3-1-1 will be described below with reference to FIGS. 14 and 15. In option 3-1-1, group A may include the partial TTIs I and M illustrated in FIG. 14, and group B may include full TTIs J, K and L illustrated in FIG. 16.

Let group A and group B be referred to as a first group and a second group, respectively. Then, a data mapping type for the first group may be indicated in a first method. For example, the BS may indicate the data mapping type for the first group by DCI (S1710). A data mapping type for the second group may be indicated in a second method, for example, by a higher-layer signal (S1720). The first method and the second method may be the same or different.

The data mapping type configured for each group is applied commonly to the TTIs of the group. That is, when data mapping type A is configured for the first group and data mapping type B is configured for the second group, the BS may transmit a PDSCH based on data mapping type A in the TTIs I and M of the first group, and transmit the PDSCH based on data mapping type B in the TTIs J, K and L of the second group (S1730). In another example, the UE may transmit a PUSCH based on data mapping type A in the TTIs I and M of the first group, and transmit the PUSCH based on data mapping type B in the TTIs J, K, and L of the second group.

Alternatively, a candidate group of data mapping type combinations for partial TTIs and full TTIs (or a candidate group of data mapping type combinations for multiple TTIs) may be configured by a higher-layer signal or the like. Then, one candidate of the candidate group may be indicated by DCI (option 3-2 or 3-3).

For example, according to option 3-2, combinations of data mapping type candidates for the first group and the second group classified based on TTI types (e.g., {A, A}, {A, B}, {B, A}, {B, B}) may be configured by a higher-layer signal, and then one candidate (e.g., {A, B}) may be indicated by DCI.

For example, according to option 3-3, candidates for a data mapping type combination for a plurality of TTIs may be configured by a higher-layer signal, and one of the candidates may be indicated by DCI.

Proposed method #3 may be applied in combination with other proposed methods of the present disclosure, unless contradicting each other.

[Proposed Method #4] Method of Determining DM-RS Transmission Information

When the BS indicates data scheduling in a plurality of TTIs or slots to the UE, and when the BS indicates information related to DM-RS transmission on a PDSCH (or PUSCH), information about DM-RS transmission in the plurality of TTIs or slots for the data transmission may be allocated (on a TTI basis) in one or more of the following methods.

(1) Opt. 4-1: (A single piece of) DM-RS transmission information is indicated by DCI and applied commonly to the plurality of slots.

(2) Opt. 4-2: The TTIs are divided into two groups A and B. DM-RS transmission information for one of the two groups is indicated by DCI, and DM-RS transmission information for the other group is configured in a pre-agreed method or by a higher-layer signal.
  A. Opt. 4-2-1: Group A=partial TTI(s), Group B=full TTI(s)
  B. Opt. 4-2-2: Group A=first/Last TTI, group B=middle TTI(s)
  C. Opt. 4-2-3: Group A=first TTI, group B=other TTI(s)

(3) Opt. 4-3: The TTIs are into two groups A and B, candidates for a DM-RS transmission information combination for the two groups are configured by a higher-layer signal, and one of the candidates is indicated by DCI.
  A. Opt. 4-3-1: Group A=partial TTI(s), Group B=full TTI(s)
  B. Opt. 4-3-2: Group A=first/last TTI, group B=middle TTI(s)
  C. Opt. 4-3-3: Group A=first TTI, group B=other TTI(s)

(4) Opt. 4-4: Candidates for a DM-RS transmission information combination for the plurality of TTIs are configured by a higher layer, and one of the candidates is indicated by DCI.

The DM-RS transmission information may include configuration information related to DM-RS transmission and reception, such as the number of groups currently in use among DM-RS resource groups placed in a code division multiplexing (CDM) relationship, the number of DM-RS antenna ports, the number of (front loaded) DM-RS symbols, and information indicating whether the DM-RS is configured in units of one symbol or two consecutive symbols.

Figure 14:
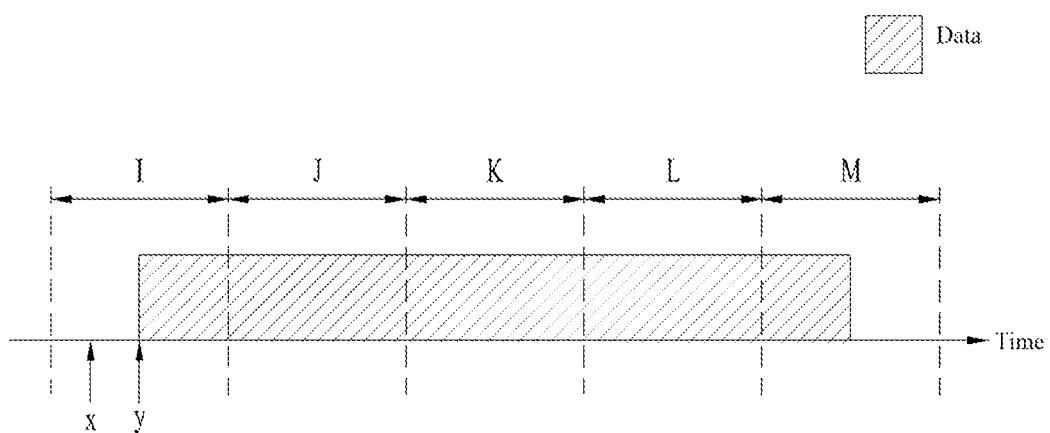
Figure 15:
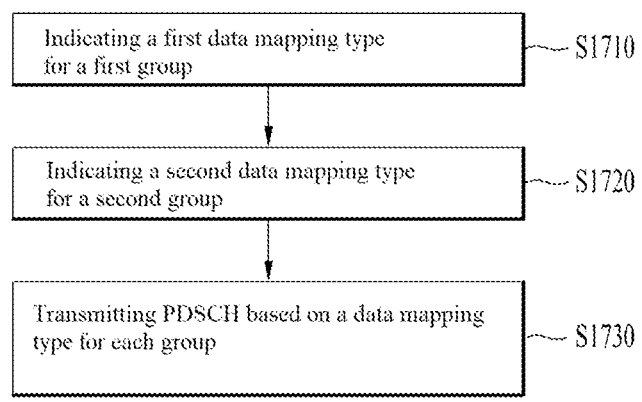

As described above, a TTI with all symbol(s) carrying data is a full TTI (e.g., the TTIs J, K and L in FIG. 14), and a TTI with some (consecutive) symbol(s) carrying data at the beginning (or end) is a partial TTI (e.g., the TTIs I and M in FIG. 14). A middle TTI is a TTI other than the first and last TTIs.

Considering unlicensed-band LBT in the NR U-band according to an embodiment of the present disclosure, transmitting data in available contiguous time resources may be favorable in terms of channel occupancy during multi-TTI scheduling. Most of a plurality of TTIs may be full TTIs each with all symbols carrying data, whereas only the first and last ones of the TTIs may be partial TTIs each with some consecutive symbol(s) carrying data at the beginning (or end). In the NR system, DM-RS transmission information may be indicated to the UE, including information about the number of groups currently in use among DM-RS resource groups placed in a CDM relationship (data transmission in the corresponding resource groups is not expected), the number of DM-RS antenna ports, the number of (front loaded) DM-RS symbols, and information indicating whether the DM-RS is configured in units of one symbol or two consecutive symbols, during PDSCH (or PUSCH) transmission. Herein, how to configure the DM-RS transmission information for each TTI during multi-TTI scheduling needs to be considered.

In one method, one piece of DM-RS transmission information may be indicated by DCI and applied commonly to all of the plurality of TTIs (option 4-1).

In another method, the TTIs may be classified into two groups, partial TTI and full TTI according to the transmission types of the TTIs. DM-RS transmission information for one of the two groups may be indicated by DCI, and DM-RS transmission information for the other group may be configured in a pre-agreed method or by a higher-layer signal (option 4-2).

Figure 16:
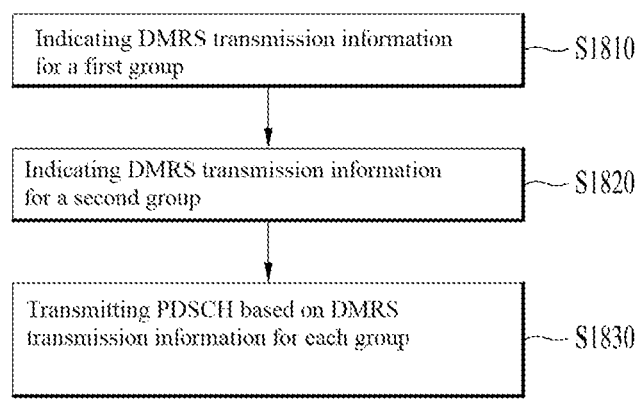

For example, option 4-2-2 will be described below with reference to FIGS. 14 and 16. In option 4-2-2, group A may include the first and last TTIs I and M of FIG. 14, and group B may include the middle TTIs J, K and L of FIG. 14.

Let group A and group B be referred to as a first group and a second group, respectively. Then, DM-RS transmission information for the first group may be indicated in a first method. For example, the BS may indicate DM-RS transmission information for the first group by DCI. DM-RS transmission information for the second group may be indicated in a second method, for example, by a higher-layer signal (S1810 to S1820). The first method and the second method may be the same or different.

The DM-RS transmission information configured for each group is equally applied to the TTIs of the group. For example, the DM-RS transmission information configured for the first group is equally applied to the TTIs I and M. Similarly, the DM-RS transmission information configured for the second group is equally applied to the TTIs J, K, and L. The BS may transmit a PDSCH based on the common DM-RS transmission information for each group (S1830).

Alternatively, the UE may transmit a PUSCH based on the common DM-RS transmission information for each group.

Alternatively, a candidate group for a DM-RS transmission information combination for partial TTIs and full TTIs (or a candidate group for a DM-RS transmission information combination for multiple TTIs) may be configured by a higher-layer signal, and then one candidate of the candidate group may be indicated by DCI (option 4-3 or 4-4).

For example, according to option 4-3, the BS may divide the TTIs into two groups in the same manner as in option 4-2. Candidates for a DM-RS transmission information combination for the each groups may be configured by a higher-layer signal and then as a higher layer signal or the like, and then one of the candidates may be indicated by DCI.

For example, according to option 4-4, the BS may configure candidates for a data mapping type combination for a plurality of TTIs by a higher-layer signal and indicate one of the candidates by DCI, without dividing the plurality of TTIs into groups.

Proposed method #4 may be applied in combination with other proposed methods of the present disclosure, unless contradicting each other.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 17:
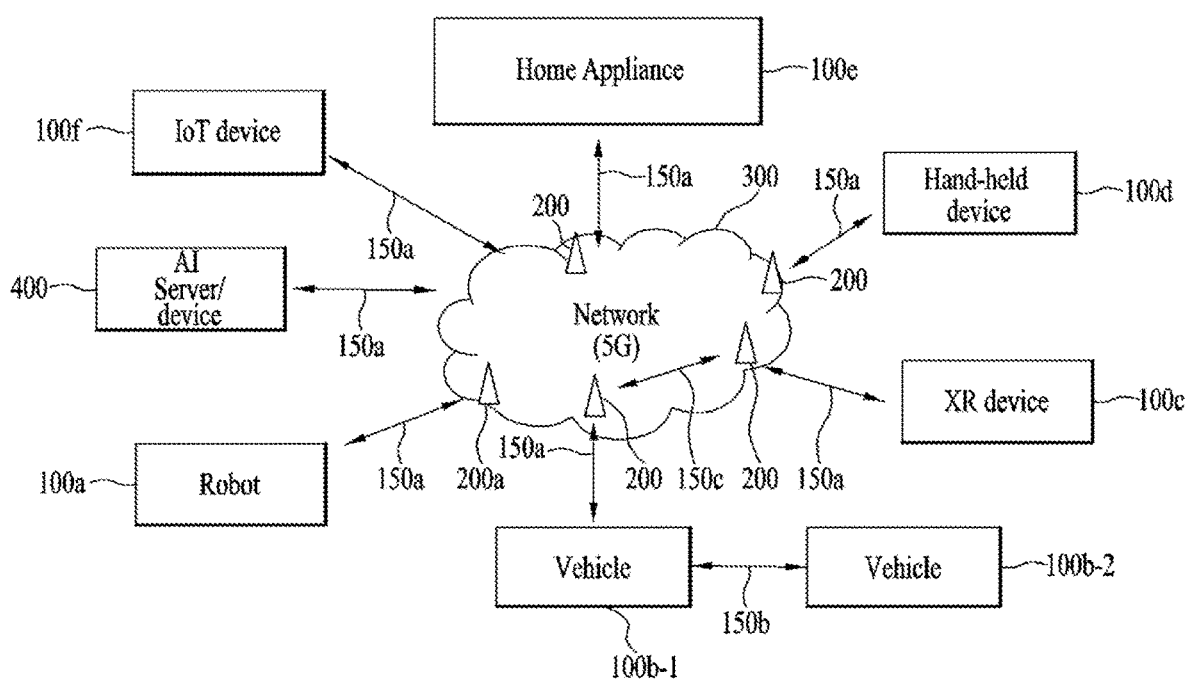
FIG. 17 is a diagram illustrating an exemplary communication system applied to the present disclosure.

FIG. 17 illustrates a communication system 1 applied to the present disclosure

Referring to FIG. 17, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 18:
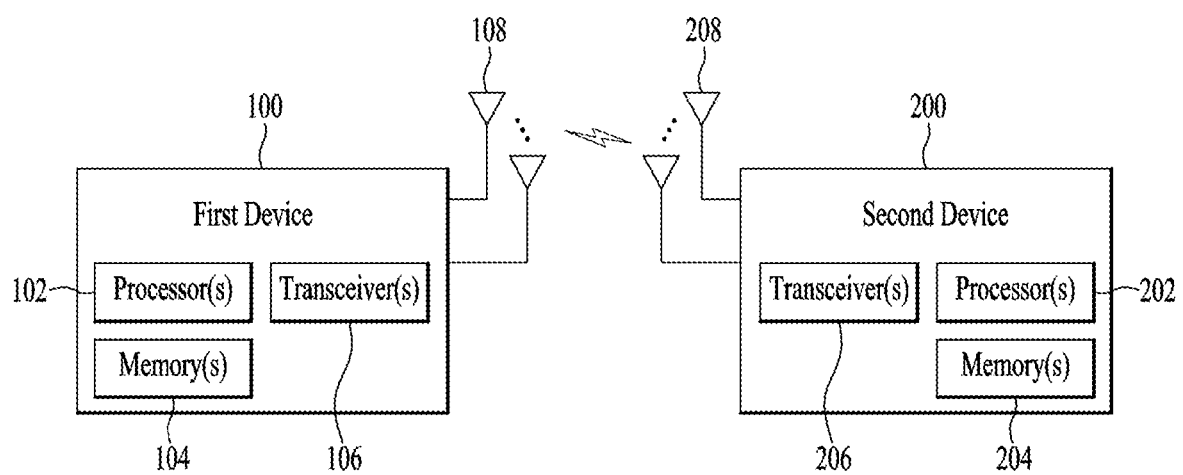
FIG. 18 is a block diagram illustrating an exemplary wireless device applicable to the present disclosure.

FIG. 18 illustrates wireless devices applicable to the present disclosure.

Referring to FIG. 18, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

For example, the processor 102 or 202 of the wireless device 100 or 200 according to the present disclosure may receive scheduling information for a plurality of consecutive TTIs through the transceiver 106 or 206 and transmit or receive data based on the scheduling information. The processor 102 or 202 may transmit or receive the data in a starting symbol in the first of the plurality of consecutive TTIs to an ending symbol in the last of the TTIs based on the scheduling information. Further, the processor 102 or 202 may determine the indexes of the starting symbol and ending symbol based on a combination of a first symbol index and the number of consecutive symbols, included in the scheduling information.

Figure 19:
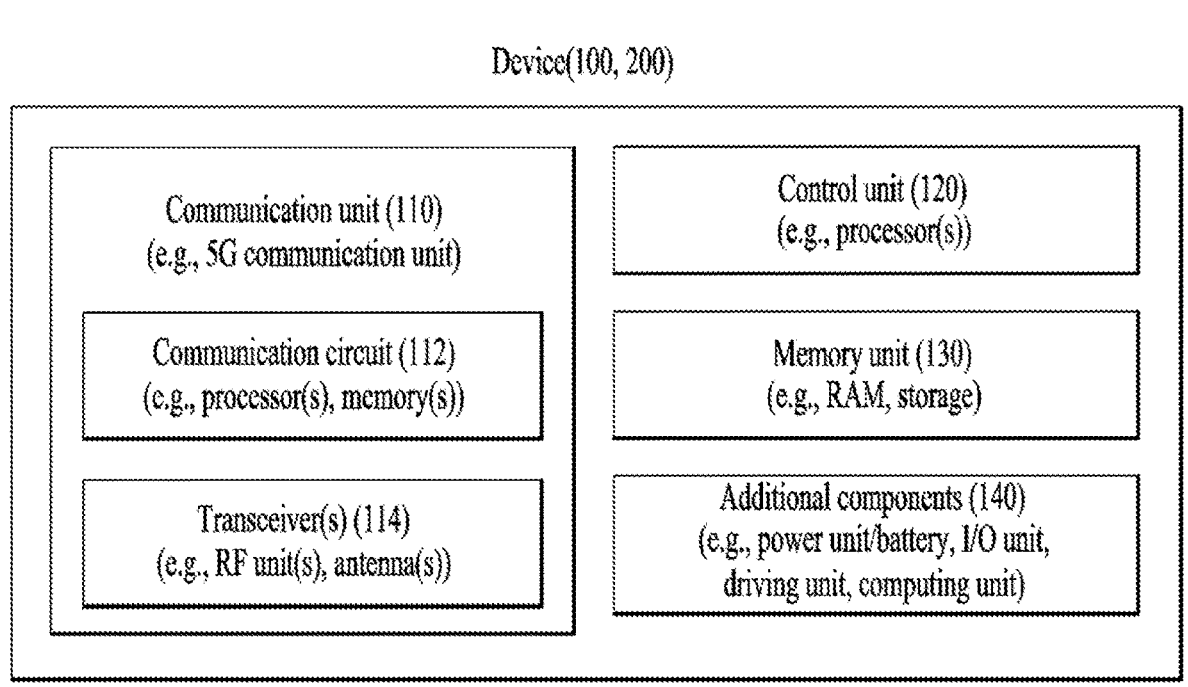
FIG. 19 is a block diagram illustrating another exemplary wireless device applicable to the present disclosure.

FIG. 19 illustrates another example of a wireless device applied to the present disclosure. The wireless device may be implemented in various forms according to a use case/service (refer to FIG. 17).

Referring to FIG. 19, wireless devices 100 and 200 may correspond to the wireless devices 100 and 200 of FIG. 17 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcasting terminal, a hologram device, a public safety device, an MTC device, a medical device, a FinTech device (or a finance device), a security device, a climate/environment device, the AI server/device (400 of FIG. 17), the BSs (200 of FIG. 17), a network node, or the like. The wireless device may be mobile or fixed according to a use case/service.

In FIG. 19, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 20:
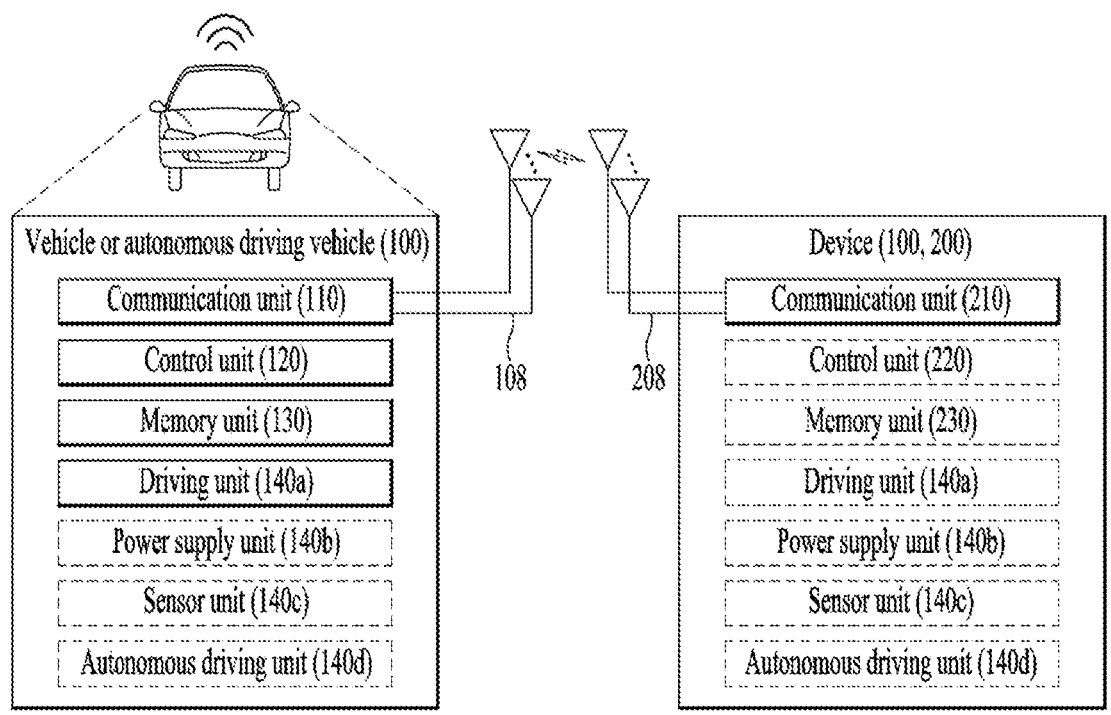
FIG. 20 is a block diagram illustrating an exemplary vehicle or autonomous driving vehicle applicable to the present disclosure.

FIG. 20 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to a UE, a BS, or other equipment in a wireless mobile communication system.

What is claimed is:

1. A method of transmitting multiple Physical Uplink Shared Channels (PUSCHs) by a user equipment (UE) in a wireless communication system, the method comprising:
   receiving Downlink Control Information (DCI) used for scheduling of N PUSCHs; and
   transmitting the N PUSCHs based on N start and length indicator values (SLIVs) indicated by the DCI,
   wherein each of the N PUSCHs corresponds to a separate SLIV of the N SLIVs, and
   wherein the N is integer and equal to or greater than 2.

2. The method of claim 1, further comprising:
   receiving information related to candidates of N SLIVs, and
   wherein the DCI includes information related to one of the candidates of N SLIVs.

3. The method of claim 1, wherein each of the N SLIVs is used for determining (i) starting symbol and (ii) a number of consecutive symbols counting from the starting symbol, for PUSCH corresponding to the each of the N SLIVs.

4. The method of claim 1, wherein the N PUSCHs are allocated to N consecutive slots, and
   wherein a first slot of the N consecutive slots corresponds to a first SLIV of the N SLIVs, and a second slot of the N consecutive slots corresponds to a second SLIV of the N SLIVs.

5. A user equipment (UE) configured to transmit multiple Physical Uplink Shared Channels (PUSCHs) in a wireless communication system, the UE comprising:
   at least one transceiver;
   at least one processor; and
   at least one computer memory operably connectable to the at least one processor and storing instructions that, when executed by the at least one processor, perform operations comprising:
   receiving, through the at least one transceiver, Downlink Control Information (DCI) used for scheduling of N PUSCHs; and
   transmitting, through the at least one transceiver, the N PUSCHs based on N start and length indicator values (SLIVs) indicated by the DCI,
   wherein each of the N PUSCHs corresponds to a separate SLIV of the N SLIVs, and
   wherein the N is integer and equal to or greater than 2.

6. The UE of claim 5, wherein the operations further comprise:
   receiving information related to candidates of N SLIVs, and
   wherein the DCI includes information related to one of the candidates of N SLIVs.

7. The UE of claim 5, wherein each of the N SLIVs is used for determining (i) starting symbol and (ii) a number of consecutive symbols counting from the starting symbol, for PUSCH corresponding to the each of the N SLIVs.

8. The UE of claim 5, wherein the N PUSCHs are allocated to N consecutive slots, and wherein a first slot of the N consecutive slots corresponds to a first SLIV of the N SLIVs, and a second slot of the N consecutive slots corresponds to a second SLIV of the N SLIVs.

9. A base station (BS) configured to transmit multiple Physical Uplink Shared Channels (PUSCHs) in a wireless communication system, the BS comprising:
at least one transceiver;
at least one processor; and
at least one computer memory operably connectable to the at least one processor and storing instructions that, when executed by the at least one processor, perform operations comprising:
transmitting, through the at least one transceiver, Downlink Control Information (DCI) used for scheduling of N PUSCHs; and
receiving, through the at least one transceiver, the N PUSCHs based on N start and length indicator values (SLIVs) indicated by the DCI,
wherein each of the N PUSCHs corresponds to a separate SLIV of the N SLIVs, and
wherein the N is integer and equal to or greater than 2.

10. The BS of claim 9, the operations further comprising:
transmitting information related to candidates of N SLIVs, and
wherein the DCI includes information related to one of the candidates of N SLIVs.

11. The BS of claim 9, wherein each of the N SLIVs is used for determining (i) starting symbol and (ii) a number of consecutive symbols counting from the starting symbol, for PUSCH corresponding to the each of the N SLIVs.

12. The BS of claim 9, wherein the N PUSCHs are allocated to N consecutive slots, and
wherein a first slot of the N consecutive slots corresponds to a first SLIV of the N SLIVs, and a second slot of the N consecutive slots corresponds to a second SLIV of the N SLIVs.

13. A method of receiving multiple Physical Uplink Shared Channels (PUSCHs) by a base station (BS) in a wireless communication system, the method comprising:
transmitting Downlink Control Information (DCI) used for scheduling of N PUSCHs; and
receiving the N PUSCHs based on N start and length indicator values (SLIVs) indicated by the DCI,
wherein each of the N PUSCHs corresponds to a separate SLIV of the N SLIVs, and
wherein the N is integer and equal to or greater than 2.

14. The method of claim 13, further comprising:
transmitting information related to candidates of N SLIVs, and
wherein the DCI includes information related to one of the candidates of N SLIVs.

15. The method of claim 13, wherein each of the N SLIVs is used for determining (i) starting symbol and (ii) a number of consecutive symbols counting from the starting symbol, for PUSCH corresponding to the each of the N SLIVs.

16. The method of claim 13, wherein the N PUSCHs are allocated to N consecutive slots, and
wherein a first slot of the N consecutive slots corresponds to a first SLIV of the N SLIVs, and a second slot of the N consecutive slots corresponds to a second SLIV of the N SLIVs.

* * * * *